(12) United States Patent (10) Patent No.: US 9,053,702 B2
Rajendran et al. (45) Date of Patent: Jun. 9, 2015

(54) SYSTEMS, METHODS, APPARATUS, AND COMPUTER-READABLE MEDIA FOR BIT ALLOCATION FOR REDUNDANT TRANSMISSION

(71) Applicant: Qualcomm Incorporated, San Diego, CA (US)

(72) Inventors: Vivek Rajendran, San Diego, CA (US); Venkatesh Krishnan, San Diego, CA (US); Daniel J. Sinder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 243 days.

(21) Appl. No.: 13/719,701

(22) Filed: Dec. 19, 2012

(65) Prior Publication Data

US 2013/0185084 A1 Jul. 18, 2013

Related U.S. Application Data

(60) Provisional application No. 61/586,007, filed on Jan. 12, 2012, provisional application No. 61/587,507, filed on Jan. 17, 2012, provisional application No. 61/641,093, filed on May 1, 2012.

(51) Int. Cl.
*G10L 19/00* (2013.01)
*G10L 21/00* (2013.01)
(Continued)

(52) U.S. Cl.
CPC ............... *G10L 19/04* (2013.01); *G10L 19/008* (2013.01); *H04L 1/0009* (2013.01); *H04L 1/0014* (2013.01); *H04L 1/007* (2013.01);
(Continued)

(58) Field of Classification Search
CPC ..... H04L 1/0014; H04L 1/0009; H04L 1/007; H04L 1/08; G10L 19/008; G10L 19/04; G10L 19/005; G10L 19/09; G10L 19/107; G10L 21/00
USPC .................................................. 704/219, 500
See application file for complete search history.

(56) References Cited

U.S. PATENT DOCUMENTS 5,732,389 A * 3/1998 Kroon et al. ................... 704/223
5,828,676 A * 10/1998 Hurlbut et al. ................ 714/752
(Continued)

FOREIGN PATENT DOCUMENTS

EP 0936772 A2 8/1999
EP 1441532 A2 7/2004
(Continued)

OTHER PUBLICATIONS

Gandikota V.R., et al., "Adaptive FEC-Based Packet Loss Resilience Scheme for Supporting Voice Communication over Ad hoc Wireless Networks", IEEE Transactions on Mobile Computing, IEEE Service Center, Los Alamitos, CA, US, vol. 7, No. 10, Oct. 1, 2008, pp. 1184-1199, XP011335279, ISSN: 1536-1233, DOI: 10.1109/TMC. 2008.42.

(Continued)

*Primary Examiner* — Daniel Abebe
(74) *Attorney, Agent, or Firm* — Austin Rapp & Hardman

(57) ABSTRACT

Compressibility-based reallocation of initial bit allocations for frames of an audio signal is described. Applications to redundancy-based retransmission of critical frames (e.g., for fixed-bit-rate modes of speech codec operation) are also described.

40 Claims, 26 Drawing Sheets

(51) Int. Cl.
   *G10L 19/04*    (2013.01)
   *G10L 19/008*   (2013.01)
   *H04L 1/00*     (2006.01)
   *H04L 1/08*     (2006.01)
   *G10L 19/005*   (2013.01)
   *G10L 19/107*   (2013.01)
   *G10L 19/09*    (2013.01)

(52) U.S. Cl.
   CPC ............... *H04L 1/08* (2013.01); *G10L 19/005* (2013.01); *G10L 19/107* (2013.01); *G10L 19/09* (2013.01)

(56) References Cited

U.S. PATENT DOCUMENTS

| | | | |
|---|---|---|---|
| 6,445,686 | B1 | 9/2002 | Hoffbeck et al. |
| 7,546,508 | B2 | 6/2009 | Greer |
| 7,590,237 | B2 | 9/2009 | Krause et al. |
| 7,944,470 | B2 | 5/2011 | Foster et al. |
| 8,255,207 | B2 * | 8/2012 | Vaillancourt et al. ......... 704/219 |
| 2005/0267743 | A1 | 12/2005 | Gerlach |
| 2008/0077410 | A1 | 3/2008 | Ojala et al. |
| 2009/0170499 | A1 | 7/2009 | Vaisanen et al. |
| 2010/0312552 | A1 | 12/2010 | Zheng et al. |
| 2013/0185062 | A1 | 7/2013 | Krishnan et al. |

FOREIGN PATENT DOCUMENTS

| | | |
|---|---|---|
| TW | 200838128 A | 9/2008 |
| TW | 201146026 A | 12/2011 |

OTHER PUBLICATIONS

International Search Report and Written Opinion—PCT/US2012/071015—ISA/EPO—Mar. 15, 2013.

Rubino G., et al., "Evaluating the utility of media-dependent FEC in VoiP flows", Quality of Service in the Emerging Networking Panorama. Fifth International Workshop on Quality of Future Internet Services, QofiS 2004. First Workshop on Quality of Service Routing, WQoSR 2004. Fourth International Workshop on Internet Charging and, Oct. 1, 2004, pp. 31-43, XP055055283, Berlin, Germany ISBN: 978-3-54-023238-4 Retrieved from the Internet: URL:http://www.irisa.fr/armor/lesmembres/Rubino/Para ev/QQA/fec.pdf [retrieved on Mar. 5, 2013].

Sanneck H. et al., "Packet Loss Recovery and Control for Voice Transmission over the Internet", Berlin, 2000, pp. 223, Source: http://sanneck.net/research/publications/thesis/Sann0010_Loss.pdf.

Mullner R. et al., "Exploiting AMR-WB Audio Bandwidth Extension for Quality and Capacity Increase", Mobile and Wireless Communications Summit, 2007. 16th 1ST, Jul. 1-5, 2007, pp. 1-7.

\* cited by examiner

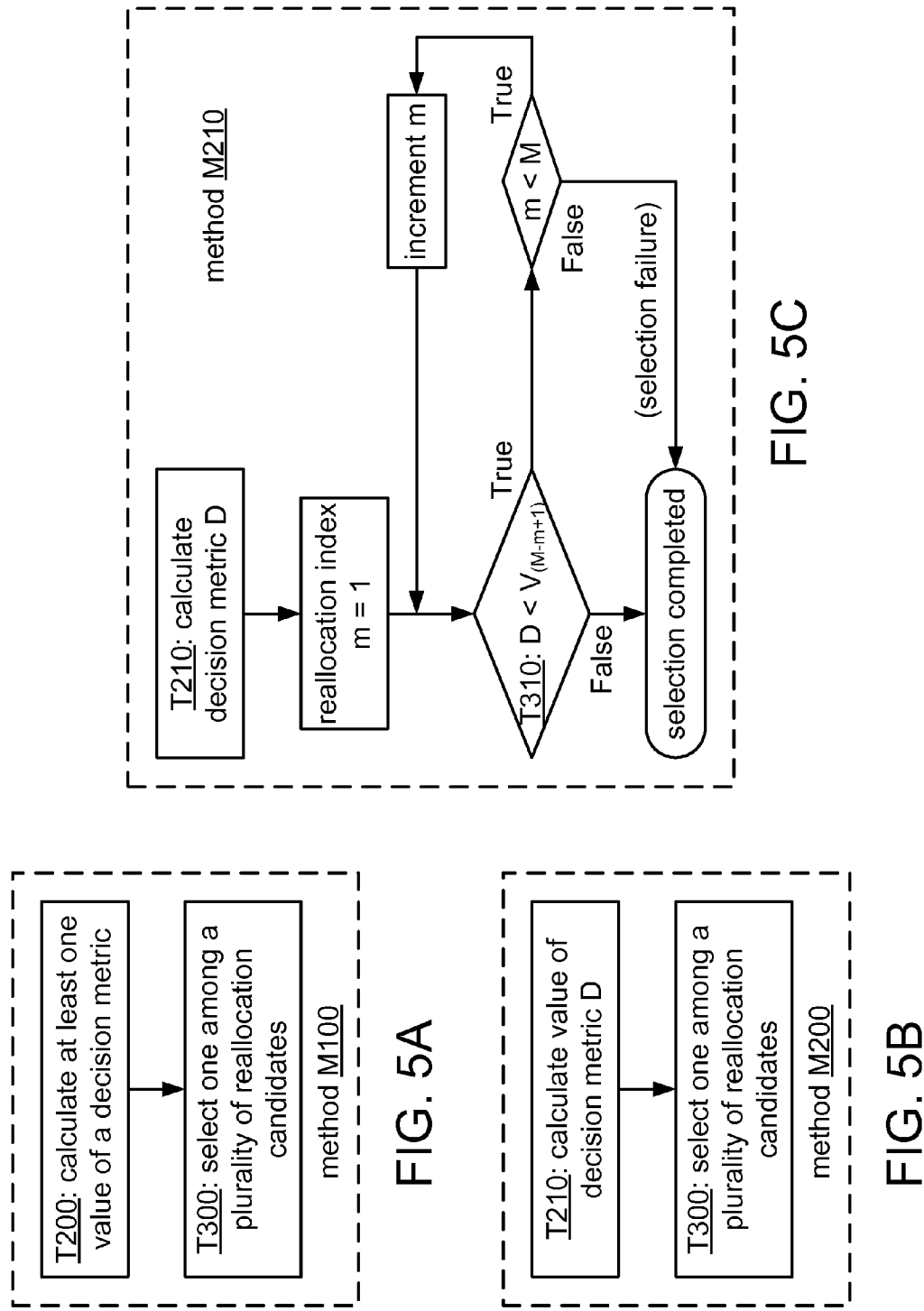

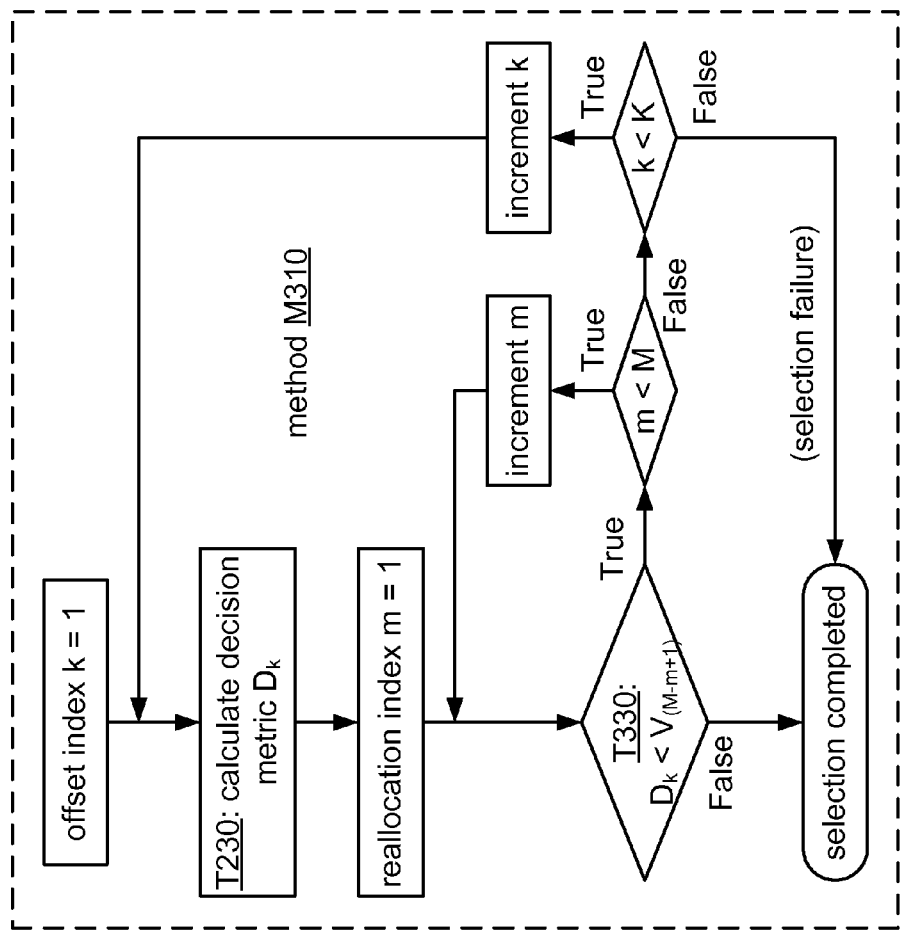
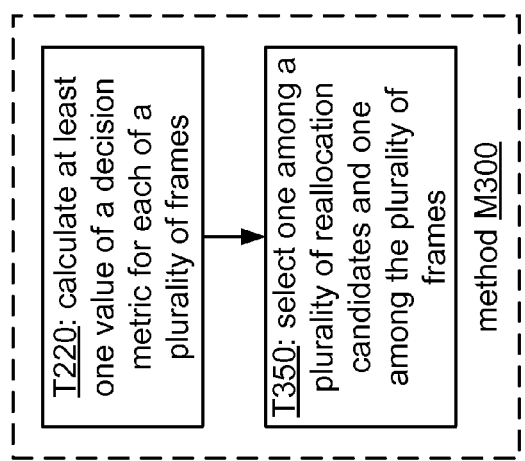
FIG. 7B
FIG. 7A

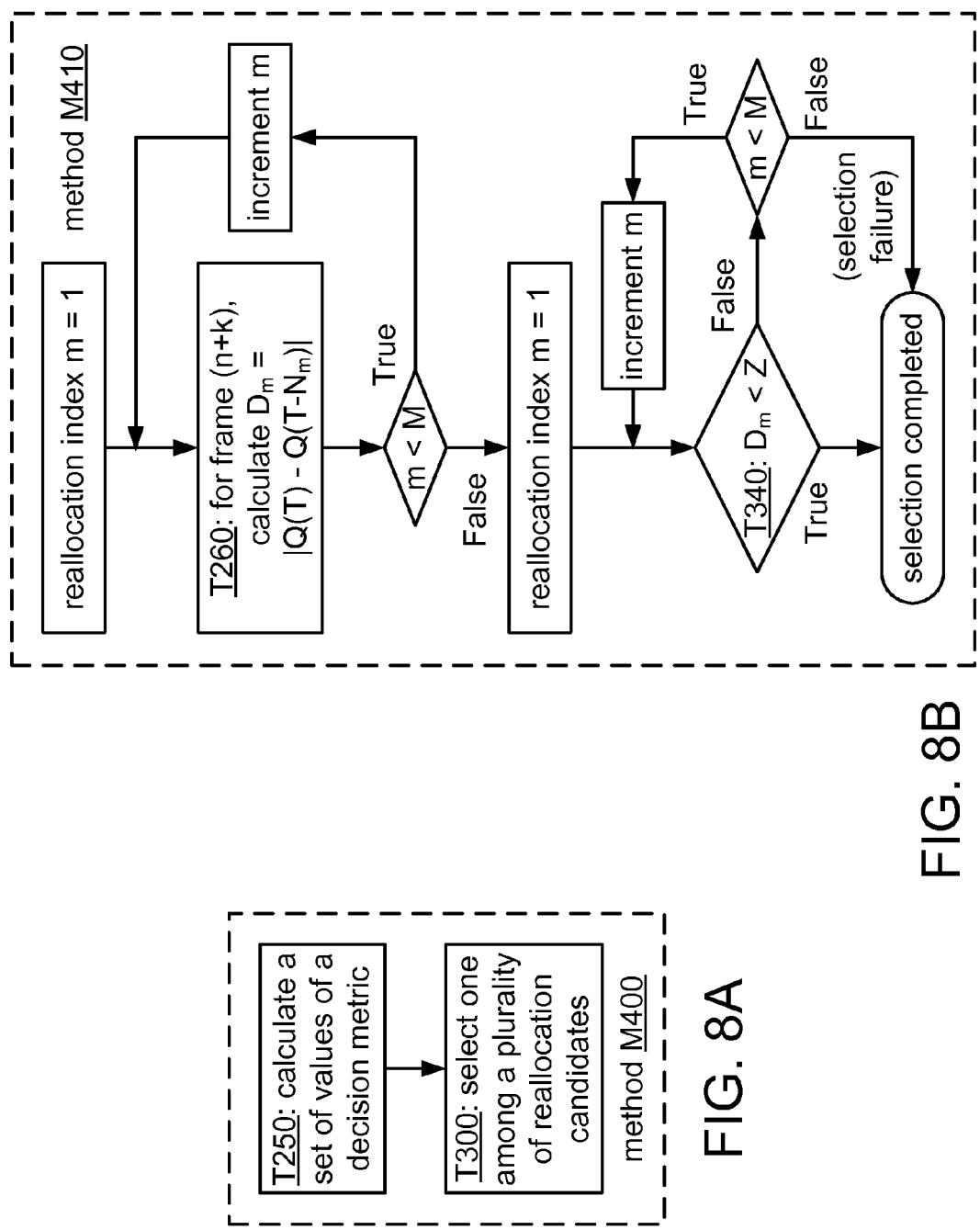

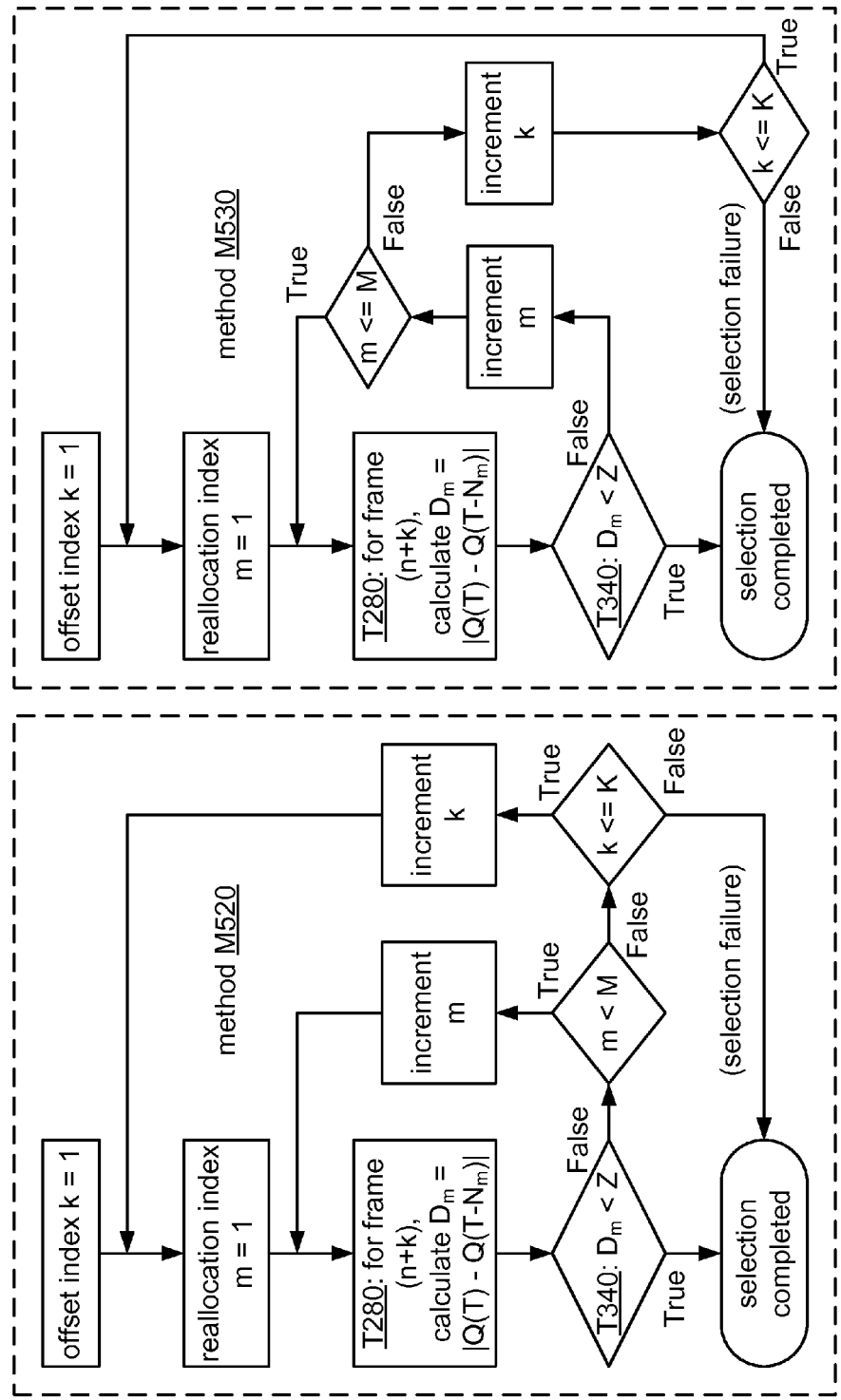

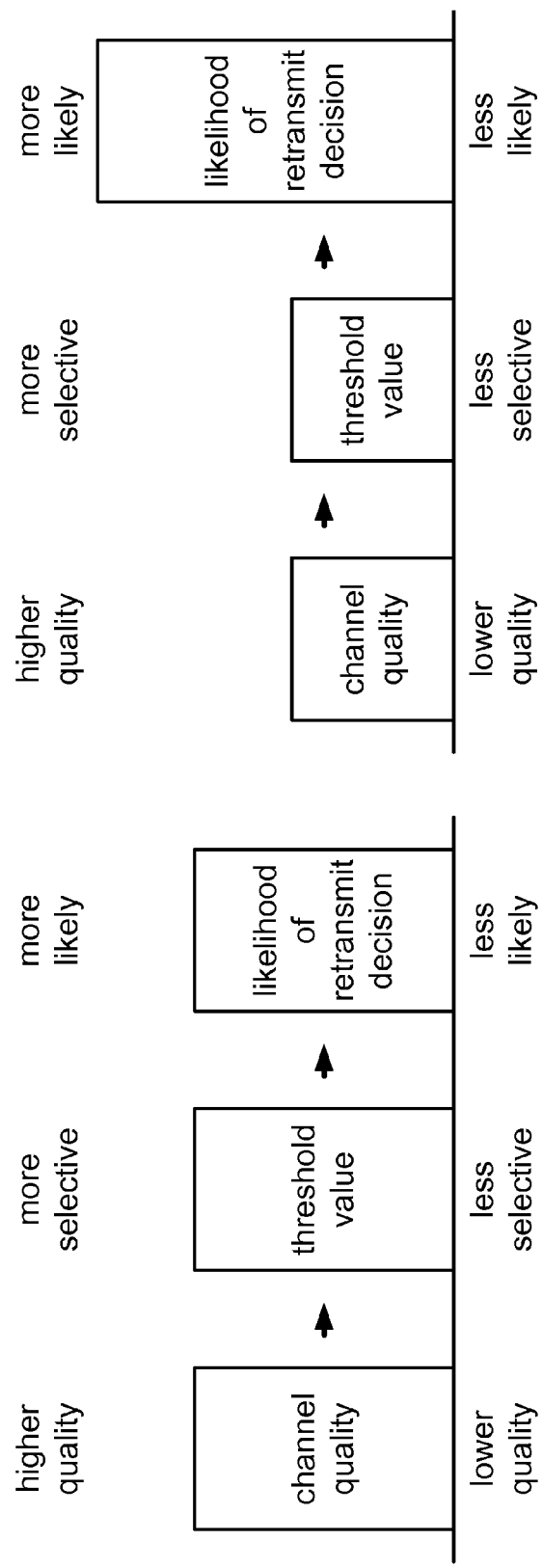

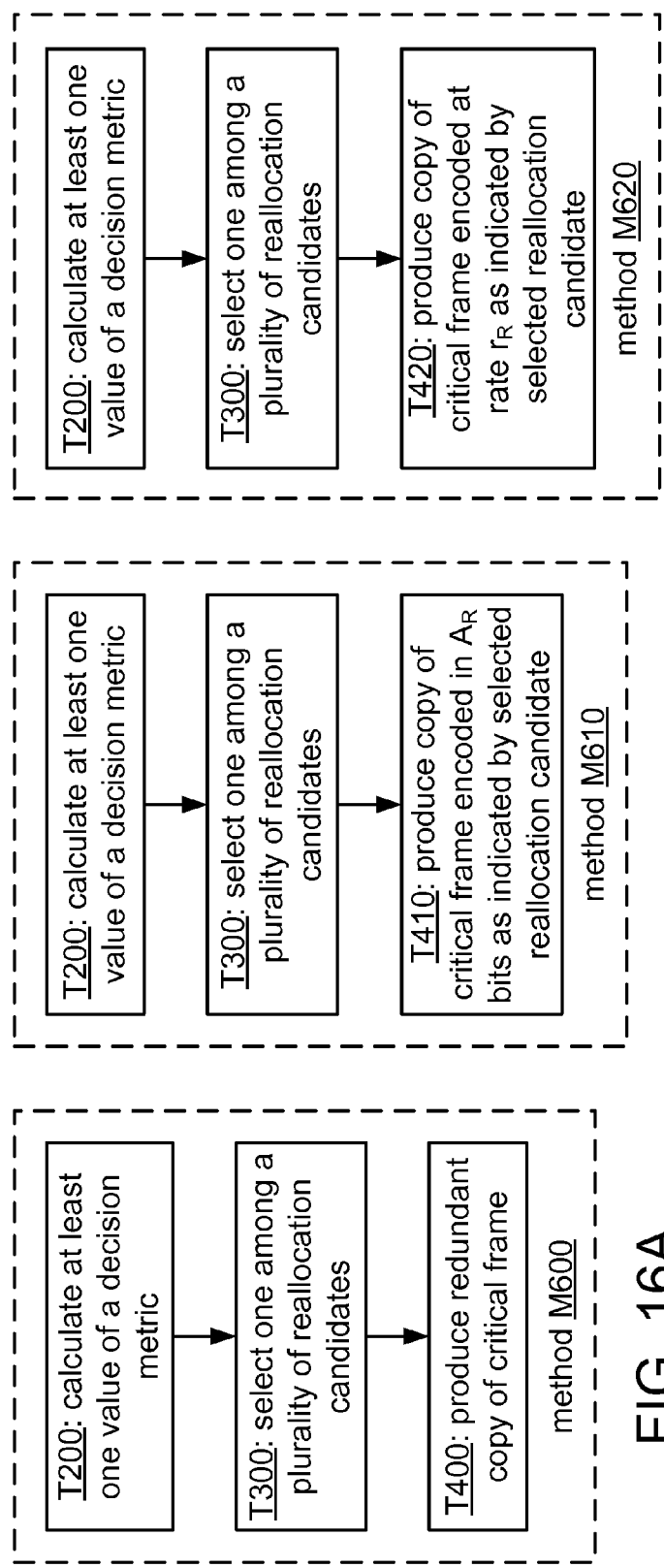

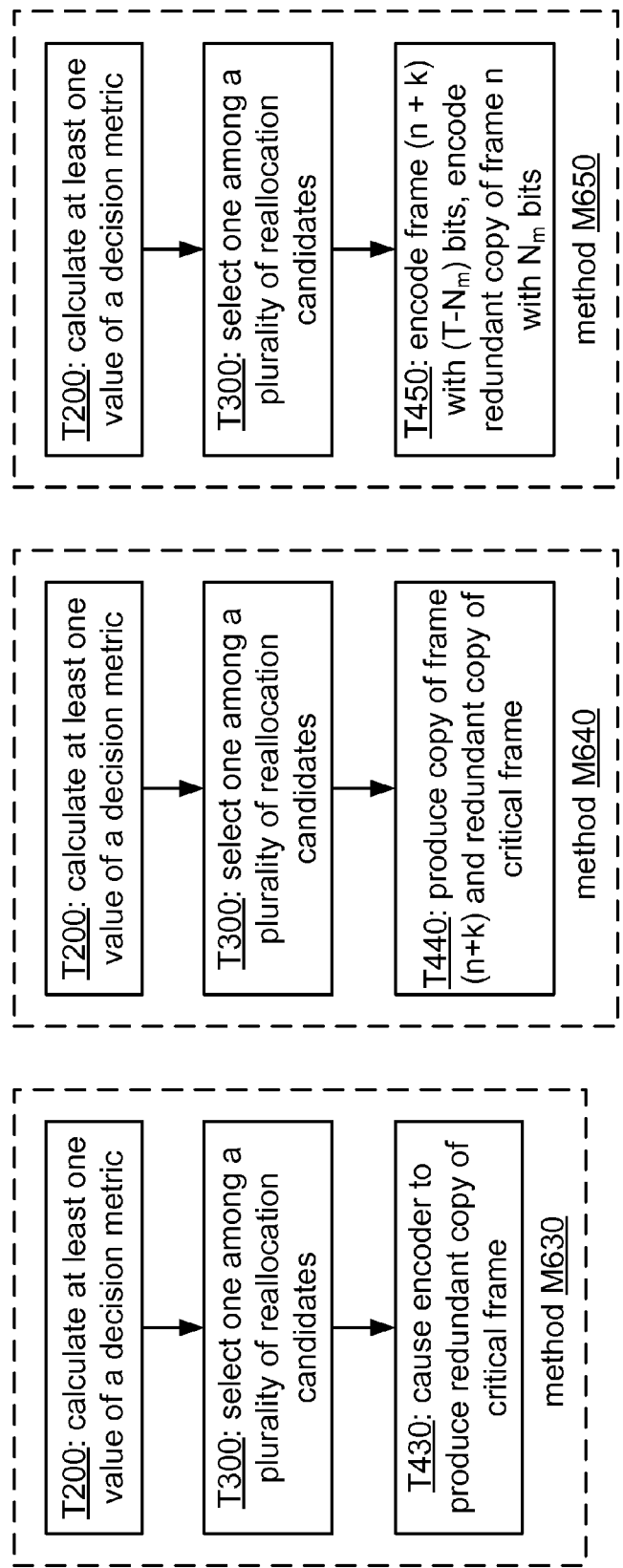

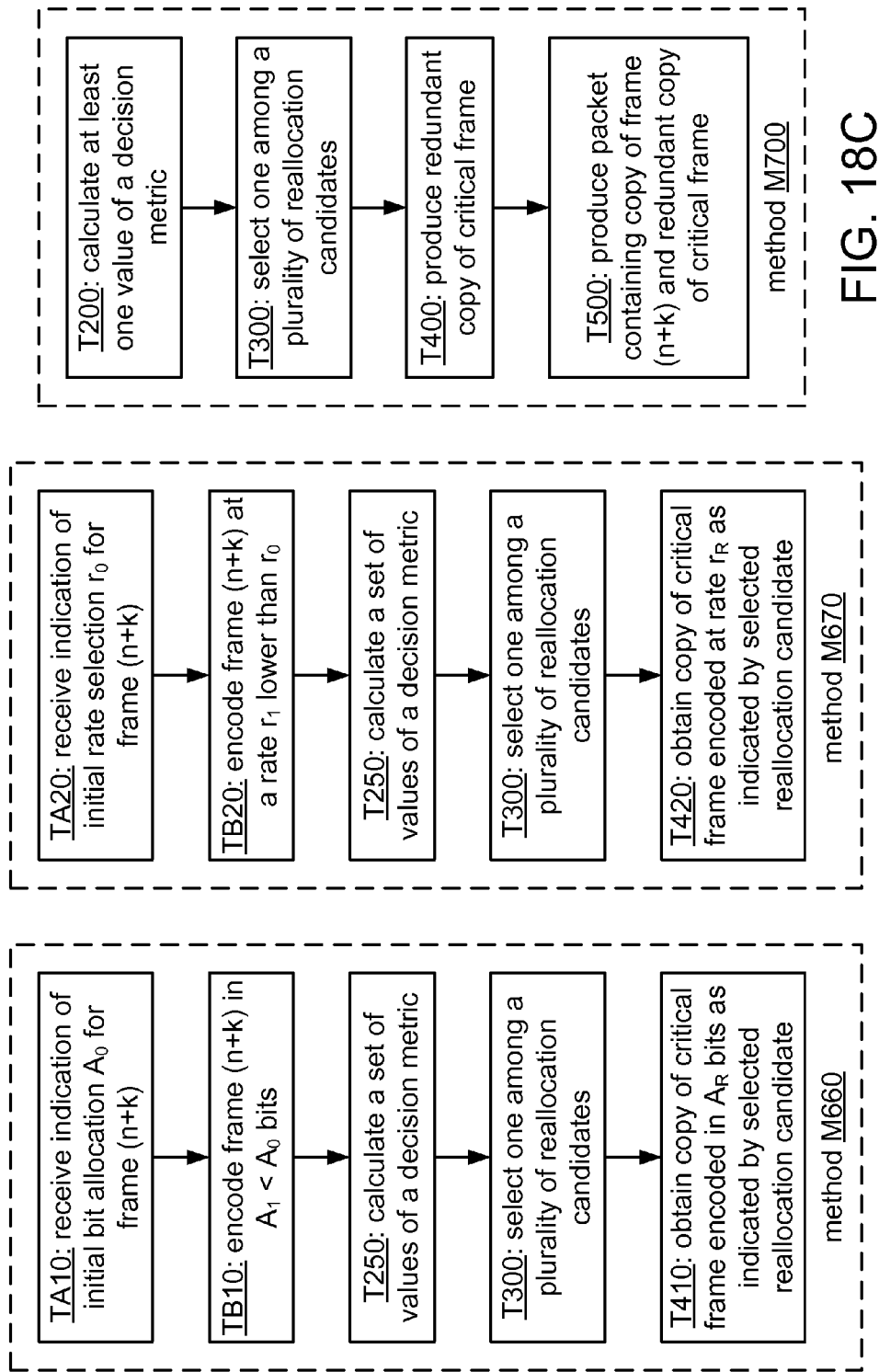

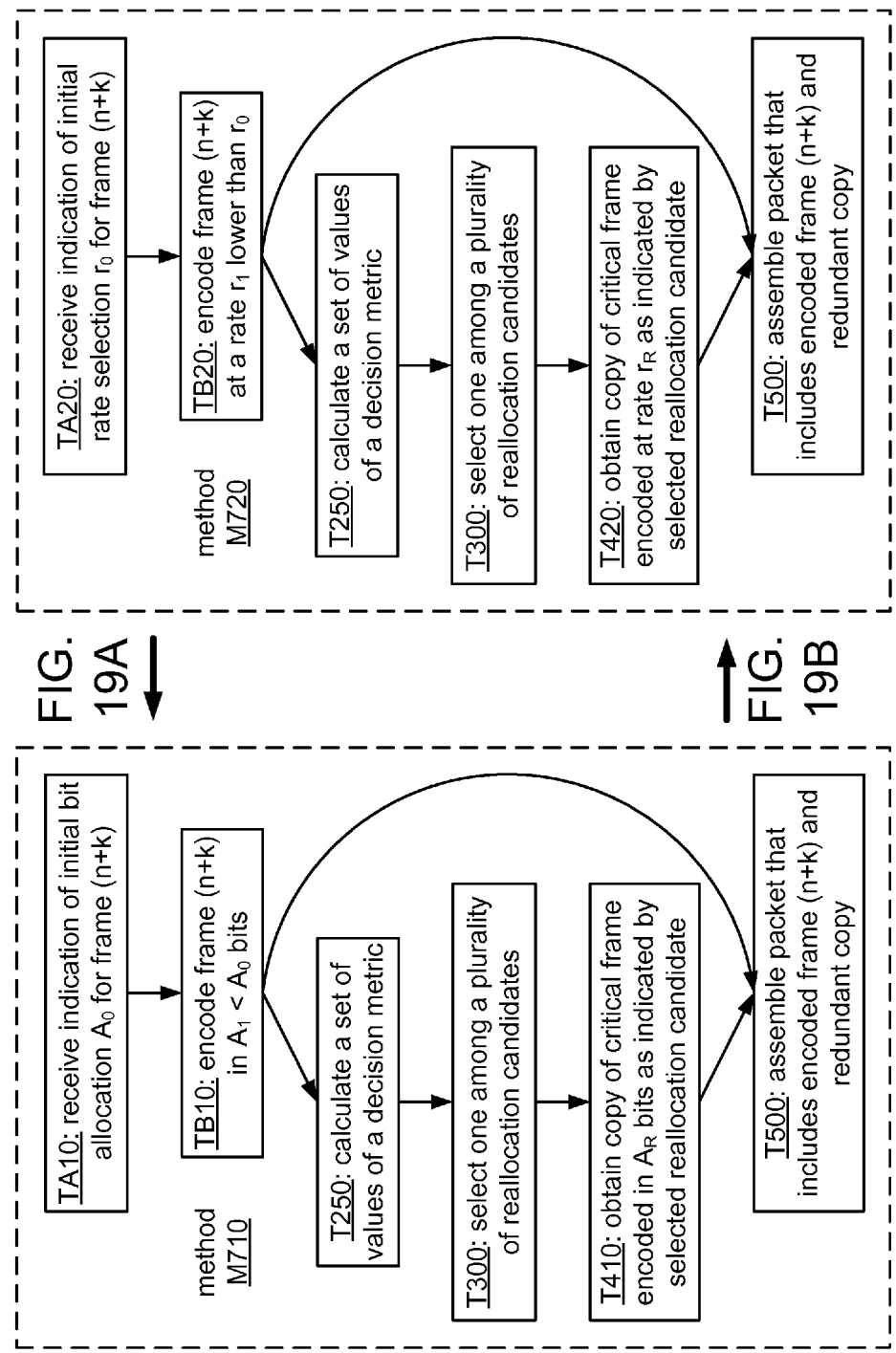

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|CMR=1 |1| FT=0  |1|0| FT=1  |1|p(0)                            |
+-+-+-+-+-+-+-+-+-+-+-+-+-+-+-+-+-+-+-+-+-+-+-+-+-+-+-+-+-+-+-+-+
|                                                               |
+-+-+-+-+-+-+-+-+-+-+-+-+-+-+-+-+-+-+-+-+-+-+-+-+-+-+-+-+-+-+-+-+
|                                                               |
+-+-+-+-+-+-+-+-+-+-+-+-+-+-+-+-+-+-+-+-+-+-+-+-+-+-+-+-+-+-+-+-+
|                         p(131)|r(0)                           |
+-+-+-+-+-+-+-+-+-+-+-+-+-+-+-+-+-+-+-+-+-+-+-+-+-+-+-+-+-+-+-+-+
|                                                               |
+-+-+-+-+-+-+-+-+-+-+-+-+-+-+-+-+-+-+-+-+-+-+-+-+-+-+-+-+-+-+-+-+
|                                                               |
+-+-+-+-+-+-+-+-+-+-+-+-+-+-+-+-+-+-+-+-+-+-+-+-+-+-+-+-+-+-+-+-+
|                                                               |
+-+-+-+-+-+-+-+-+-+-+-+-+-+-+-+-+-+-+-+-+-+-+-+-+-+-+-+-+-+-+-+-+
|                                                               |
+-+-+-+-+-+-+-+-+-+-+-+-+-+-+-+-+-+-+-+-+-+-+-+-+-+-+-+-+-+-+-+-+
|                                                               |
+-+-+-+-+-+-+-+-+-+-+-+-+-+-+-+-+-+-+-+-+-+-+-+-+-+-+-+-+-+-+-+-+
|                                                               |
+-+-+-+-+-+-+-+-+-+-+-+-+-+-+-+-+-+-+-+-+-+-+-+-+-+-+-+-+-+-+-+-+
|                                                               |
+-+-+-+-+-+-+-+-+-+-+-+-+-+-+-+-+-+-+-+-+-+-+-+-+-+-+-+-+-+-+-+-+
|r(176)|P|P|P|                                                  |
+-+-+-+-+-+-+-+-+-+-+-+-+-+-+-+-+-+-+-+-+-+-+-+-+-+-+-+-+-+-+-+-+
```

FIG. 21

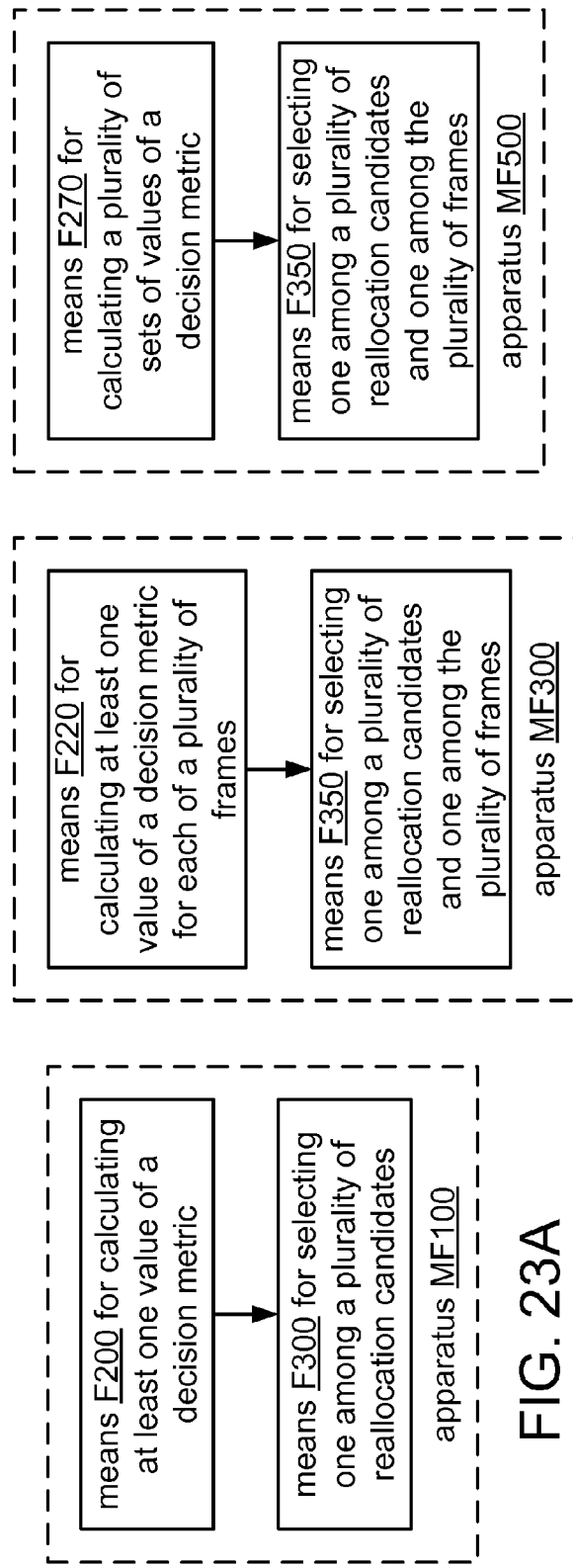

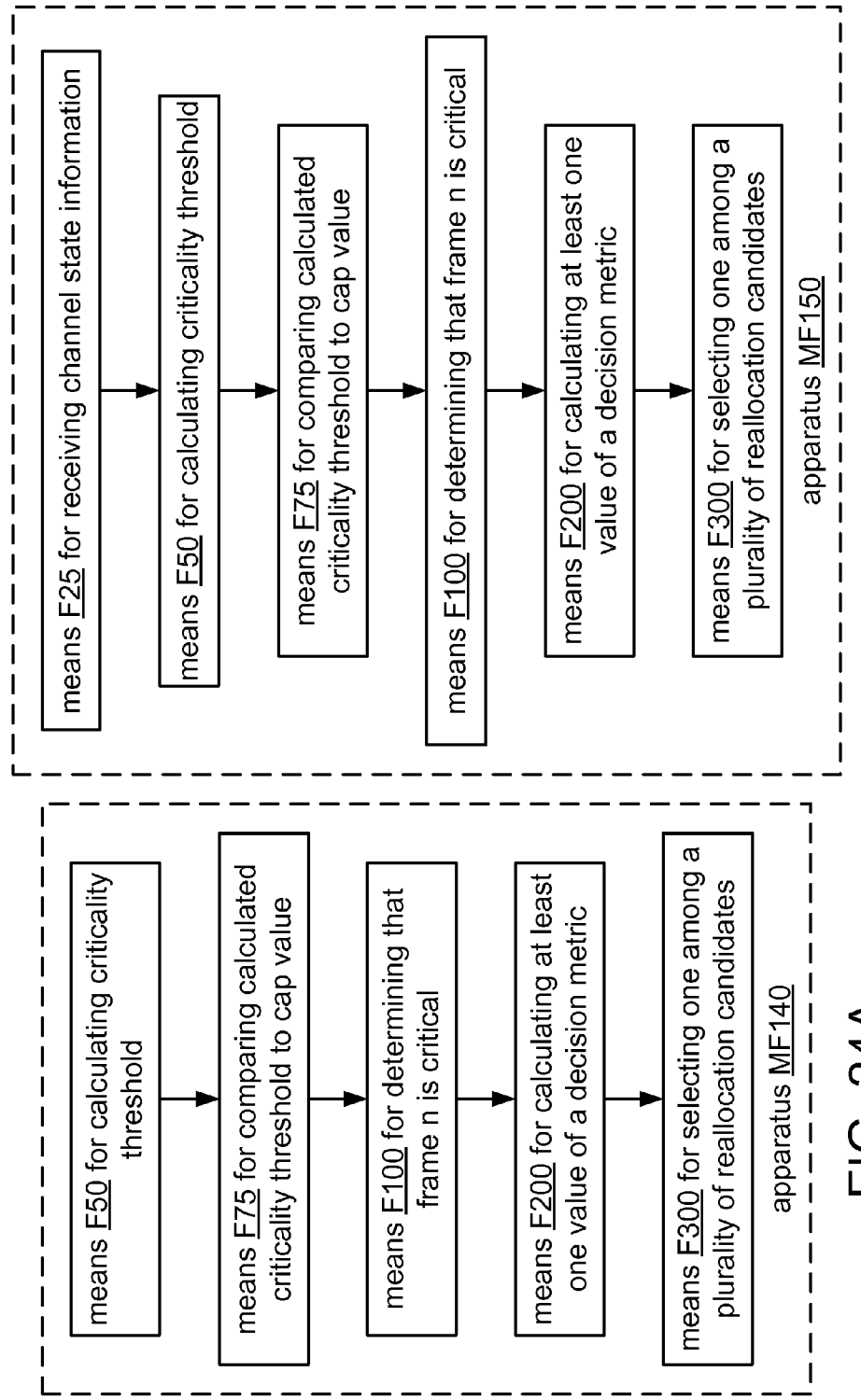

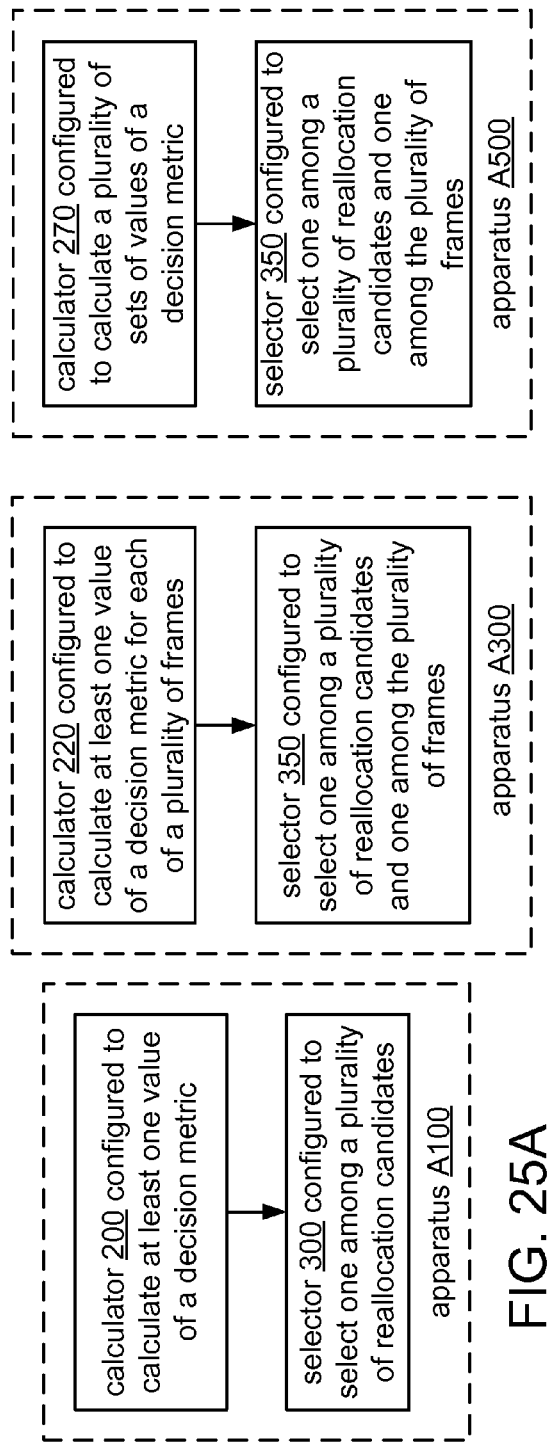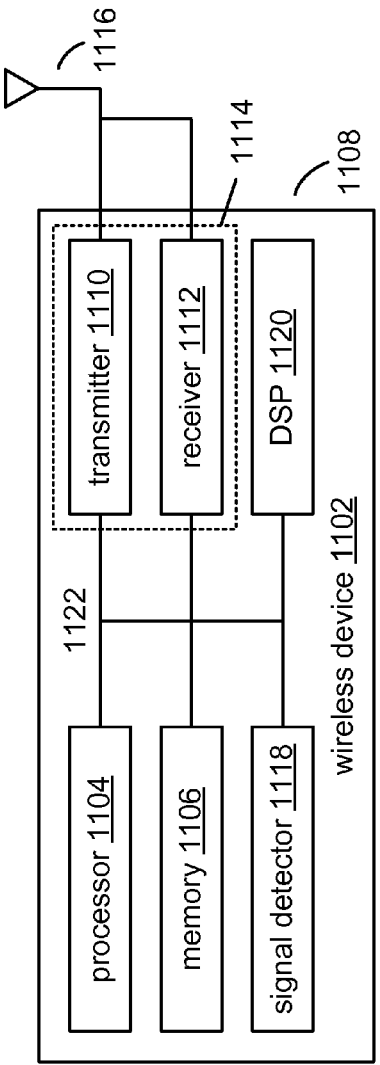
FIG. 25A
FIG. 25B
FIG. 25C
FIG. 25D

SYSTEMS, METHODS, APPARATUS, AND COMPUTER-READABLE MEDIA FOR BIT ALLOCATION FOR REDUNDANT TRANSMISSION

CLAIM OF PRIORITY UNDER 35 U.S.C. §119

The present Application for Patent claims priority to Provisional Application No. 61/586,007, entitled "SYSTEMS, METHODS, APPARATUS, AND COMPUTER-READABLE MEDIA FOR BIT ALLOCATION FOR REDUNDANT TRANSMISSION" filed Jan. 12, 2012, and assigned to the assignee hereof. The present Application for Patent also claims priority to Provisional Application No. 61/587,507, entitled "SYSTEMS, METHODS, APPARATUS, AND COMPUTER-READABLE MEDIA FOR CRITICALITY THRESHOLD CONTROL," filed Jan. 17, 2012, and assigned to the assignee hereof. The present Application for Patent also claims priority to Provisional Application No. 61/641,093 entitled "SYSTEMS, METHODS, APPARATUS, AND COMPUTER-READABLE MEDIA FOR BIT ALLOCATION FOR REDUNDANT TRANSMISSION," filed May 1, 2012, and assigned to the assignee hereof.

BACKGROUND

1. Field

This disclosure relates to audio communications.

2. Background

Digital audio telecommunications have been performed over circuit-switched networks. A circuit-switched network is a network in which a physical path is established between two terminals for the duration of a call. In circuit-switched applications, a transmitting terminal sends a sequence of packets containing audio (e.g., voice) information over the physical path to the receiving terminal. The receiving terminal uses the audio information contained in the packets (e.g., voice information) to synthesize the corresponding audio signal (e.g., a speech signal).

Digital audio telecommunications have started to be performed over packet-switched networks. A packet-switched network is a network in which the packets are routed through the network based on a destination address. With packet-switched communications, routers determine a path for each packet individually, sending it down any available path to reach its destination. As a result, the packets may not arrive at the receiving terminal at the same time or in the same order. A de-jitter buffer may be used in the receiving terminal to put the packets back in order and play them out in a continuous sequential fashion.

On some occasions, a packet is lost in transit from the transmitting terminal to the receiving terminal. A lost packet may degrade the quality of the synthesized audio signal. As such, benefits may be realized by providing systems and methods to address a loss of information within a frame (e.g., within a speech frame).

SUMMARY

A method of processing an audio signal according to a general configuration includes calculating at least one value of a decision metric for a second frame of the audio signal that is subsequent in the audio signal to a first frame (e.g., a critical frame) of the audio signal. This method also includes selecting one among a plurality of reallocation candidates, based on the at least one calculated value of the decision metric. In this method, the calculated at least one value is based on a measure of compressibility of the second frame, and the selected reallocation candidate indicates a reallocation of an initial bit allocation for the second frame into a first portion and a second portion. Computer-readable storage media (e.g., non-transitory media) having tangible features that cause a machine reading the features to perform such a method are also disclosed.

An apparatus for processing an audio signal according to another general configuration includes means for calculating at least one value of a decision metric for a second frame of the audio signal that is subsequent in the audio signal to a first frame (e.g., a critical frame) of the audio signal. This apparatus also includes means for selecting one among a plurality of reallocation candidates, based on said at least one calculated value of the decision metric. In this apparatus, the calculated at least one value is based on a measure of compressibility of the second frame, and the selected reallocation candidate indicates a reallocation of an initial bit allocation for the second frame into a first portion and a second portion.

An apparatus for processing an audio signal according to another general configuration includes a calculator configured to calculate at least one value of a decision metric for a second frame of the audio signal that is subsequent in the audio signal to a first frame (e.g., a critical frame) of the audio signal. This apparatus also includes a selector configured to select one among a plurality of reallocation candidates, based on said at least one calculated value of the decision metric. In this apparatus, the calculated at least one value is based on a measure of compressibility of the second frame, and the selected reallocation candidate indicates a reallocation of an initial bit allocation for the second frame into a first portion and a second portion.

BRIEF DESCRIPTION OF THE DRAWINGS

FIG. 5A shows a flowchart of a method M100 according to a general configuration.

FIG. 5B shows a flowchart of an implementation M200 of method M100.

FIG. 5C shows a flowchart of an implementation M210 of method M200.

FIG. 7A shows a flowchart of an implementation M300 of method M100.

FIG. 7B shows a flowchart for an implementation M310 of method M300.

FIG. 8A shows a flowchart for an implementation M400 of method M100.

FIG. 8B shows a flowchart for an implementation M410 of method M400.

FIG. 11A shows a flowchart for an implementation M520 of method M500.

FIG. 11B shows a flowchart for an implementation M530 of method M500.

FIGS. 14A and 14B show examples of relations between channel state information and other system parameters as described herein.

FIG. 16A shows a flowchart for an implementation M600 of method M100.

FIG. 16B shows a flowchart for an implementation M610 of method M600.

FIG. 16C shows a flowchart for an implementation M620 of method M600.

FIG. 17A shows a flowchart for an implementation M630 of method M600.

FIG. 17B shows a flowchart for an implementation M640 of method M600.

FIG. 17C shows a flowchart for an implementation M650 of method M600.

FIG. 18A shows a flowchart for an implementation M660 of methods M400 and M610.

FIG. 18B shows a flowchart for an implementation M670 of methods M400 and M620.

FIG. 18C shows a flowchart for an implementation M700 of method M600.

FIG. 19A shows a flowchart for an implementation M710 of methods M660 and M700.

FIG. 19B shows a flowchart for an implementation M720 of methods M670 and M700.

FIG. 21 shows an example of a payload of an RTP packet carrying a redundant copy of a critical frame and a copy of a subsequent frame.

FIG. 23A shows a block diagram of an apparatus MF100 according to a general configuration.

FIG. 23B shows a block diagram of an implementation MF300 of apparatus MF100.

FIG. 23C shows a block diagram of an implementation MF500 of apparatus MF100.

FIG. 24A shows a block diagram of an implementation MF140 of apparatus MF100.

FIG. 24B shows a block diagram of an implementation MF150 of apparatus MF140.

FIG. 25A shows a block diagram of an apparatus A100 according to a general configuration.

FIG. 25B shows a block diagram of an implementation A300 of apparatus A100.

FIG. 25C shows a block diagram of an implementation A500 of apparatus A100.

FIG. 25D shows a block diagram of a wireless device 1102.

DETAILED DESCRIPTION

Figure 1A:
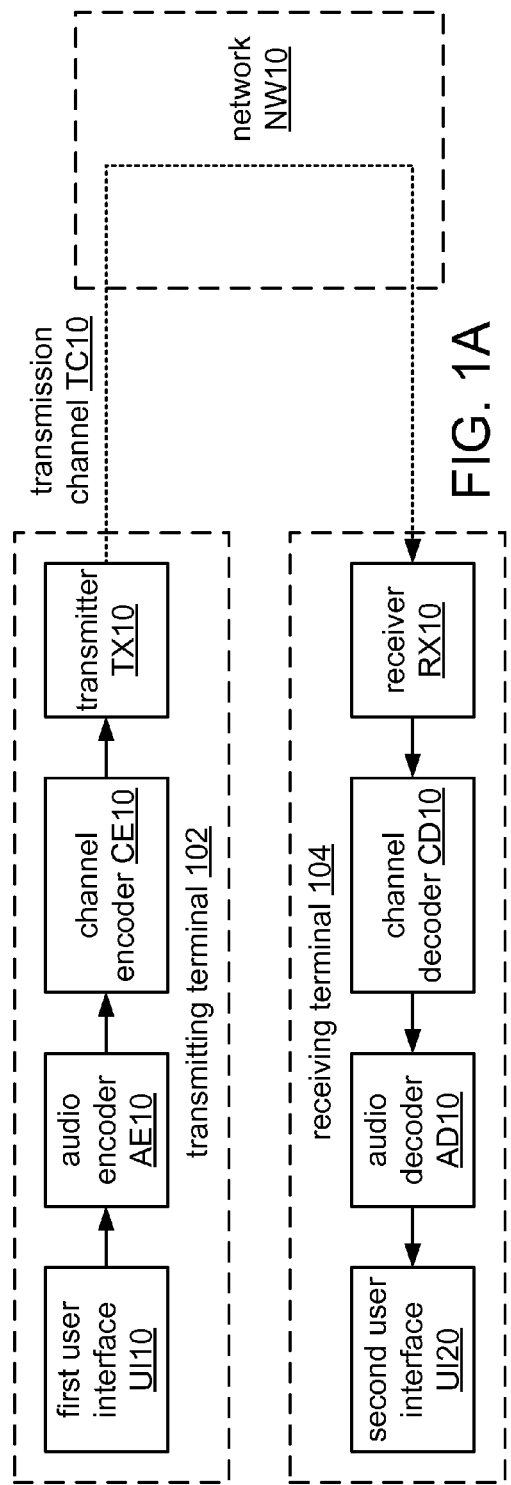
FIG. 1A is a block diagram illustrating an example of a transmitting terminal 102 and a receiving terminal 104 that communicate over network NW10.

It may be desirable to improve the robustness of a fixed-bit-rate scheme to loss of information during transmission. Systems, methods, and apparatus as described herein may be applied to adaptive redundant encoding of critical frames of an audio signal. Such adaptive encoding may include testing a plurality of shared rates (e.g., shared bit allocations) and frame offsets. Such adaptive encoding may also include determining that a frame is a critical frame.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, smoothing, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Unless expressly limited by its context, the term "determining" is used to indicate any of its ordinary meanings, such as deciding, establishing, concluding, calculating, selecting, and/or evaluating. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B"). Similarly, the term "in response to" is used to indicate any of its ordinary meanings, including "in response to at least."

Unless otherwise indicated, the term "series" is used to indicate a sequence of two or more items. The term "logarithm" is used to indicate the base-ten logarithm, although extensions of such an operation to other bases are within the scope of this disclosure. The term "frequency component" is used to indicate one among a set of frequencies or frequency bands of a signal, such as a sample of a frequency-domain representation of the signal (e.g., as produced by a fast Fourier transform or MDCT) or a subband of the signal (e.g., a Bark scale or mel scale subband).

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. A "task" having multiple subtasks is also a method. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose." The term "plurality" means "two or more." Any incorporation by reference of a portion of a document shall also be understood to incorporate definitions of terms or variables that are referenced within the portion, where such definitions appear elsewhere in the document, as well as any figures referenced in the incorporated portion.

The terms "coder," "codec," and "coding system" are used interchangeably to denote a system that includes at least one encoder configured to receive and encode frames of an audio signal (possibly after one or more pre-processing operations, such as a perceptual weighting and/or other filtering operation) and a corresponding decoder configured to produce decoded representations of the frames. Such an encoder and decoder are typically deployed at opposite terminals of a communications link. In order to support a full-duplex communication, instances of both of the encoder and the decoder are typically deployed at each end of such a link.

Unless otherwise indicated, the terms "vocoder," "audio coder," and "speech coder" refer to the combination of an audio encoder and a corresponding audio decoder. Unless otherwise indicated, the term "coding" indicates transfer of an audio signal via a codec, including encoding and subsequent decoding. Unless otherwise indicated, the term "transmitting" indicates propagating (e.g., a signal) into a transmission channel.

A coding scheme as described herein may be applied to code any audio signal (e.g., including non-speech audio). Alternatively, it may be desirable to use such a coding scheme only for speech. In such case, the coding scheme may be used with a classification scheme to determine the type of content of each frame of the audio signal and select a suitable coding scheme.

A coding scheme as described herein may be used as a primary codec or as a layer or stage in a multi-layer or multi-stage codec. In one such example, such a coding scheme is used to code a portion of the frequency content of an audio signal (e.g., a lowband or a highband), and another coding scheme is used to code another portion of the frequency content of the signal. In another such example, such a coding scheme is used to code an audio signal that is a residual (i.e., an error between the original and encoded signals) of another coding layer, such as a residual of a linear prediction coding (LPC) analysis operation.

Methods, systems, and apparatus as described herein may be configured to process the audio signal as a series of segments. Typical segment lengths range from about five or ten milliseconds to about forty or fifty milliseconds, and the segments may be overlapping (e.g., with adjacent segments overlapping by 25% or 50%) or nonoverlapping. In one particular example, the audio signal is divided into a series of nonoverlapping segments or "frames", each having a length of ten milliseconds. In another particular example, each frame has a length of twenty milliseconds. Examples of sampling rates for the audio signal include (without limitation) eight, twelve, sixteen, 32, 44.1, 48, and 192 kilohertz.

Audio telecommunications applications may be implemented in a packet-switched network. For example, audio telecommunications applications may be implemented in a Voice over Internet Protocol (VoIP) network. A packet may include one or more frames of the encoded audio signal, and packets with audio (e.g., voice) information may be transmitted from a first device to a second device on the network. However, some of the packets may be lost during the transmission of the packets. For example, the loss of multiple packets (sometimes referred to as bursty packet loss) may be a reason for the degradation of perceived speech quality at a receiving device.

In order to alleviate the degradation of the perceived speech quality caused by packet losses in a VoIP network, there exist two types of solutions. The first solution is a receiver-based packet loss concealment (PLC) approach. A PLC method may be used to mask the effects of packet loss in VoIP communications. For example, a PLC method may be implemented to create a substitute packet instead of the one that was lost during transmission. Such a PLC method may attempt to create a packet as similar as possible to the one that was lost. Receiver-based PLC methods may not need any additional resources or help from the sender in order to create the substitute packet. When important speech frames are lost, however, a PLC method may be ineffective at masking the effects of the packet loss.

The second solution is a sender-based packet loss resilient approach. Such an approach includes forward error correction (FEC) methods, which may include sending some additional data with each packet. The additional data may be used to restore errors caused by the loss of data during the transmission. For example, FEC schemes may transmit redundant audio frames. In other words, more than one copy (typically two) of an audio frame is transmitted by the sender. These two frames may be referred to as a primary copy and a redundant copy.

Although sender-based packet loss resilient schemes may improve the perceptual quality of the decoded speech, these schemes may also increase the bandwidth used during transmission of the speech. Traditional FEC schemes may also increase the end-to-end delay, which may be intolerable for real-time conversations. For example, conventional sender-based schemes send the same speech frame twice at two different time periods. This approach may at least double the data rate. Some conventional schemes may use a low-bit rate codec for the redundant copy in order to reduce the data rate. However, the use of a low-bit rate codec may increase the complexity at the encoder. In addition, some conventional schemes may use the same low-bit rate codec for both the primary copy of the frame and the redundant copy of the frame. Although this approach may reduce the complexity at the encoder as well as reduce the data rate, the baseline speech quality (i.e., the speech quality when no frames are lost) may be greatly reduced. Further, conventional sender-based schemes operate under the assumption of an additional delay of at least one frame interval.

Systems, methods, and apparatus as described herein may be implemented to provide a source-controlled (and possibly channel-controlled) FEC scheme in order to obtain an optimal trade-off between speech quality, delay and data rate. The FEC scheme may be configured such that no additional delay is introduced. High quality improvement of the speech quality under moderate data rate increases may be achieved. An FEC scheme as described herein may also operate at any target data rate. In one example, the FEC scheme and a target data rate may be adaptively adjusted based on the condition of a transmission channel as well as external controls. The proposed FEC scheme may also be implemented in a manner that is compatible with legacy communication devices (e.g., legacy handsets).

For some codecs for audio (e.g., voice) communications, the total number of bits into which each frame is encoded is a predetermined constant. Examples of such codecs include the Adaptive Multi Rate (AMR) speech codec (e.g., as described in 3GPP Technical Specification (TS) 26.071, version 10.0.0, available Apr. 5, 2011 from European Telecommunications Standards Institute (ETSI), www-dot-etsi-dot-org, Sophia Antipolis, FR) and the AMR Wideband speech codec (e.g., as described in ITU-T Recommendation G.722.2, July 2003, International Telecommunication Union, www-dot-itu-dot-int, and/or 3GPP Technical Specification 26.190 v10.0.0 (March 2011), available from ETSI), in which the number of bits is determined by the coding mode selected for the frame. In such cases, transmitting a redundant copy of a past frame may require a corresponding reduction in the number of bits available for coding the signal information in the current frame. This reduction may have a negative impact on the perceptual quality of the decoded speech.

It may be desirable to implement a flexible approach in which redundant copies are transmitted only for critical frames. A "critical frame" is a frame whose loss is expected to have a significant impact on the perceptual quality of the decoded signal. Moreover, it may be desirable to transmit such a redundant copy only if the impact of piggybacking the redundant copy on the present frame is expected to be minimal. For a fixed-bit-rate system, it may be desirable to determine a number of bits to be used for coding the current frame so that the total of the number of bits used for coding the current frame and the number of bits used for coding a redundant copy (e.g., a partial copy) of the past frame meets a target fixed bit rate T.

FIG. 1A is a block diagram illustrating an example of a transmitting terminal 102 and a receiving terminal 104 that communicate over a network NW10 via transmission channel TC10. Each of terminals 102 and 104 may be implemented to perform a method as described herein and/or to include an apparatus as described herein. The transmitting and receiving terminals 102, 104 may be any devices that are capable of supporting voice communications, including telephones (e.g., smartphones), computers, audio broadcast and receiving equipment, video conferencing equipment, or the like. The transmitting and receiving terminals 102, 104 may be implemented, for example, with wireless multiple access technology, such as Code Division Multiple Access (CDMA) capability. CDMA is a modulation and multiple-access scheme based on spread-spectrum communications.

Transmitting terminal 102 includes an audio encoder AE10, and receiving terminal 104 includes an audio decoder AD10. Audio encoder AE10 may be used to compress audio information (e.g., speech) from a first user interface UI10 (e.g., a microphone and audio front-end) by extracting values of parameters according to a model of human speech generation. A channel encoder CE10 assembles the parameter values into packets, and a transmitter TX10 transmits the packets including these parameter values over network NW10, which may include a packet-based network, such as the Internet or a corporate intranet, via transmission channel TC10. Transmission channel TC10 may be a wired and/or wireless transmission channel and may be considered to extend to an entry point of network NW10 (e.g., a base station controller), to another entity within network NW10 (e.g., a channel quality analyzer), and/or to a receiver RX10 of receiving terminal 104, depending upon how and where the quality of the channel is determined.

A receiver RX10 of receiving terminal 104 is used to receive the packets from network NW10 via a transmission channel. A channel decoder CD10 decodes the packets to obtain the parameter values, and an audio decoder AD10 synthesizes the audio information using the parameter values from the packets. The synthesized audio (e.g., speech) is provided to a second user interface UI20 (e.g., an audio output stage and loudspeaker) on the receiving terminal 104. Although not shown, various signal processing functions may be performed in channel encoder CE10 and channel decoder CD10 (e.g., convolutional coding including cyclic redundancy check (CRC) functions, interleaving) and in transmitter TX10 and receiver RX10 (e.g., digital modulation and corresponding demodulation, spread spectrum processing, analog-to-digital and digital-to-analog conversion).

Figure 2:
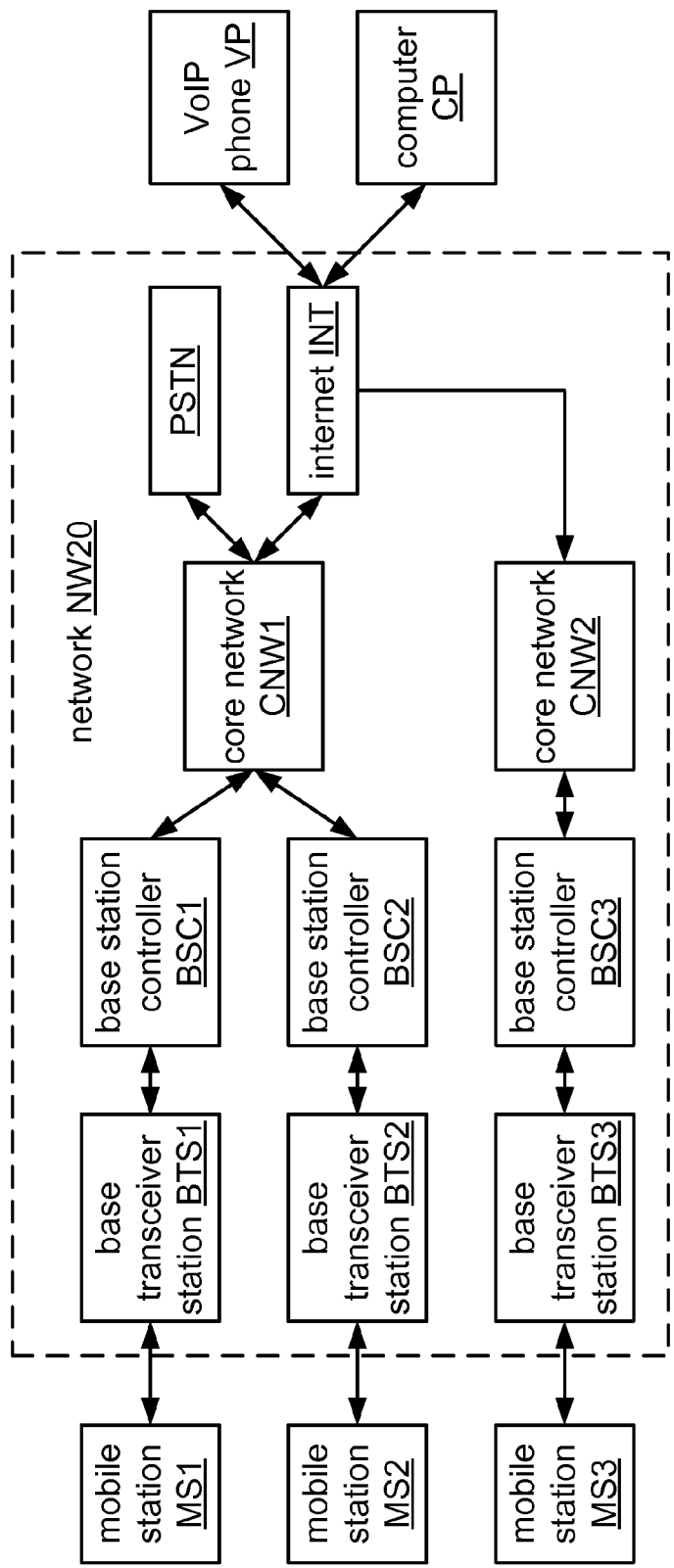
FIG. 2 shows examples of different terminal devices that may communicate with one another via a network NW20.

FIG. 2 shows an example of an implementation NW20 of network NW10 that includes base transceiver stations BTS1-BTS3, which communicate with mobile stations over radio uplink and downlink transmission channels. Network NW20 also includes core network CNW1, which is connected to the public switched telephone network PSTN and the Internet INT, and core network CNW2, which is also connected to the Internet INT. Network NW20 also includes base station controllers BSC1-BSC3 that interface the transceiver stations with the core networks. Network NW20 may be implemented to provide packet-switched communications between terminal devices. Core network CNW1 may also provide circuit-switched communications between terminal devices MS1 and MS2 via base transceiver stations BTS1, BTS2 and/or between such a terminal device and a terminal device on the PSTN.

FIG. 2 also shows examples of different terminal devices that may communicate with one another (e.g., over a packet-switched communications link) via network NW20: mobile stations MS1-MS3; Voice over IP (VoIP) telephone VP; and computer CP, which is configured to execute a telecommunications program (e.g., Skype software from Microsoft Skype Division, LU). Any of the terminal devices MS1-MS3, VP, and CP may be implemented to include an instance of transmitting terminal 102 and an instance of receiving terminal 104. Mobile devices MS1-MS3 communicate with the network via wireless radio uplink and downlink transmission channels. Terminals VP and CP communicate with the network via wired transmission channels (e.g., Ethernet cable) and/or wireless transmission channels (e.g., an IEEE 802.11 or "WiFi" link). Network NW20 may also include intermediate entities, such as gateways and/or TRAUs (Transcoder and Rate Adapter Units).

Each party to a communication may transmit as well as receive, and each terminal may include instances of audio encoder AE10 and decoder AD10. The audio encoder and decoder may be separate devices or integrated into a single device known as a "voice coder" or "vocoder." As shown in FIG. 1A, the terminals 102, 104 are described with an audio encoder AE10 at one terminal of network NW10 and an audio decoder AD10 at the other.

In at least one configuration of transmitting terminal 102, an audio signal (e.g., speech) may be input from first user interface UI10 to audio encoder AE10 in frames, with each frame further partitioned into sub-frames. Such arbitrary frame boundaries may be used where some block processing is performed. However, such partitioning of the audio samples into frames (and sub-frames) may be omitted if continuous processing rather than block processing is implemented. In the described examples, each packet transmitted across network NW10 may include one or more frames depending on the specific application and the overall design constraints.

Audio encoder AE10 may be a variable-rate or single-fixed-rate encoder. A variable-rate encoder may dynamically switch between multiple encoder modes (e.g., different fixed rates) from frame to frame, depending on the audio content (e.g., depending on whether speech is present and/or what type of speech is present). Audio decoder AD10 may also dynamically switch between corresponding decoder modes from frame to frame in a corresponding manner. A particular mode may be chosen for each frame to achieve the lowest bit rate available while maintaining acceptable signal reproduction quality at receiving terminal 104.

Audio encoder AE10 typically processes the input signal as a series of nonoverlapping segments in time or "frames," with a new encoded frame being calculated for each frame. The frame period is generally a period over which the signal may be expected to be locally stationary; common examples include twenty milliseconds (equivalent to 320 samples at a sampling rate of 16 kHz, 256 samples at a sampling rate of 12.8 kHz, or 160 samples at a sampling rate of eight kHz) and ten milliseconds. It is also possible to implement audio encoder AE10 to process the input signal as a series of overlapping frames.

Figure 1B:
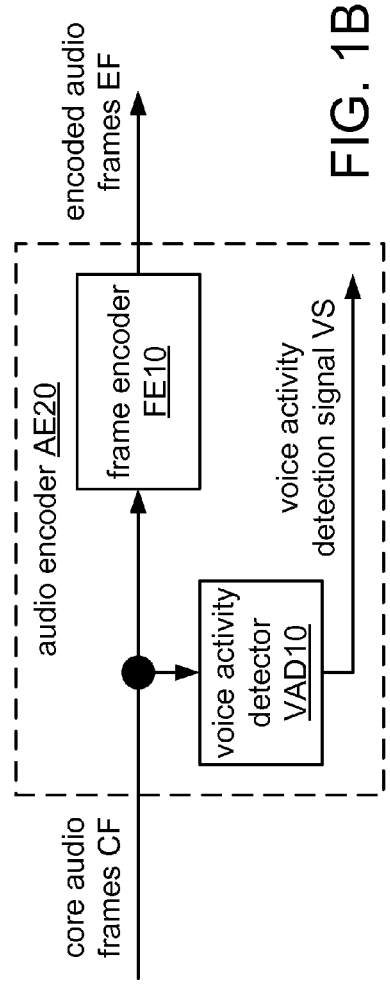
FIG. 1B shows a block diagram of an implementation AE20 of audio encoder AE10.

FIG. 1B shows a block diagram of an implementation AE20 of audio encoder AE10 that includes a frame encoder FE10. Frame encoder FE10 is configured to encode each of a sequence of core audio frames CF of the input signal to produce a corresponding one of a sequence of encoded audio frames EF. Audio encoder AE10 may also be implemented to perform additional tasks such as dividing the input signal into frames and selecting a coding mode for frame encoder FE10. Selecting a coding mode (e.g., rate control) may include performing voice activity detection (VAD) and/or otherwise classifying the audio content of the frame. In this example, audio encoder AE20 also includes a voice activity detector VAD10 that is configured to process the core audio frames CF to produce a voice activity detection signal VS (e.g., as described in 3GPP TS 26.104 v10.0.0, March 2011, available at ETSI).

Frame encoder FE10 is typically implemented according to a source-filter model that encodes each frame of the input audio signal as (A) a set of parameters that describe a filter and (B) an excitation signal that will be used at the decoder to drive the described filter to produce a synthesized reproduction of the audio frame. The spectral envelope of a speech signal is typically characterized by peaks that represent resonances of the vocal tract (e.g., the throat and mouth) and are called formants. Most speech coders encode at least this coarse spectral structure as a set of parameters, such as filter coefficients. The remaining residual signal may be modeled as a source (e.g., as produced by the vocal chords) that drives the filter to produce the speech signal and typically is characterized by its intensity and pitch.

Figure 3:
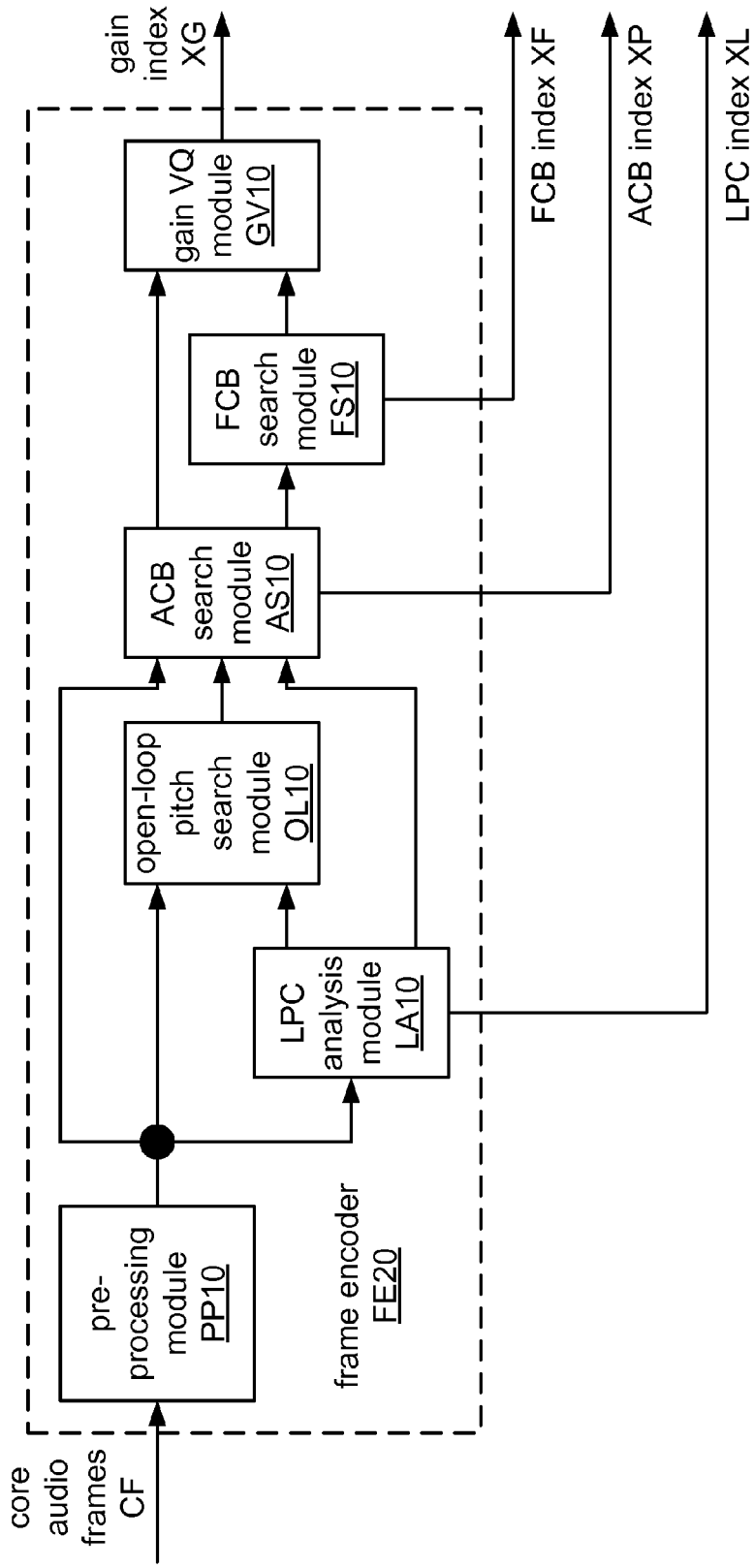
FIG. 3 shows a block diagram of a basic implementation FE20 of frame encoder FE10.

FIG. 3 shows a block diagram of a basic implementation FE20 of frame encoder FE10 that includes a preprocessing module PP10, a linear prediction coding (LPC) analysis module LA10, an open-loop pitch search module OL10, an adaptive codebook (ACB) search module AS10, a fixed codebook (FCB) search module FS10, and a gain vector quantization (VQ) module GV10. Preprocessing module PP10 may be implemented, for example, as described in section 5.1 of 3GPP TS 26.190 v10.0.0. In one such example, preprocessing module PP10 is implemented to perform downsampling of the core audio frame (e.g., from 16 kHz to 12.8 kHz), high-pass filtering of the downsampled frame (e.g., with a cutoff frequency of 50 Hz), and pre-emphasis of the filtered frame (e.g., using a first-order highpass filter).

Linear prediction coding (LPC) analysis module LA10 encodes the spectral envelope of each core audio frame as a set of linear prediction (LP) coefficients (e.g., coefficients of an all-pole filter $1/A(z)$). In one example, LPC analysis module LA10 is configured to calculate a set of sixteen LP filter coefficients to characterize the formant structure of each 20-millisecond frame. Analysis module LA10 may be implemented, for example, as described in section 5.2 of 3GPP TS 26.190 v10.0.0.

Analysis module LA10 may be configured to analyze the samples of each frame directly, or the samples may be weighted first according to a windowing function (for example, a Hamming window). The analysis may also be performed over a window that is larger than the frame, such as a 30-msec window. This window may be symmetric (e.g. 5-20-5, such that it includes the 5 milliseconds immediately before and after the 20-millisecond frame) or asymmetric (e.g. 10-20, such that it includes the last 10 milliseconds of the preceding frame). An LPC analysis module is typically configured to calculate the LP filter coefficients using a Levinson-Durbin recursion or the Leroux-Gueguen algorithm. Although LPC encoding is well suited to speech, it may also be used to encode generic audio signals (e.g., including non-speech, such as music). In another implementation, the analysis module may be configured to calculate a set of cepstral coefficients for each frame instead of a set of LP filter coefficients.

Linear prediction filter coefficients are typically difficult to quantize efficiently and are usually mapped into another representation, such as line spectral pairs (LSPs) or line spectral frequencies (LSFs), or immittance spectral pairs (ISPs) or immittance spectral frequencies (ISFs), for quantization and/or entropy encoding. In one example, analysis module LA10 transforms the set of LP filter coefficients into a corresponding set of ISFs. Other one-to-one representations of LP filter coefficients include parcor coefficients and log-area-ratio values. Typically a transform between a set of LP filter coefficients and a corresponding set of LSFs, LSPs, ISFs, or ISPs is reversible, but embodiments also include implementations of analysis module LA10 in which the transform is not reversible without error.

Analysis module LA10 is configured to quantize the set of ISFs (or LSFs or other coefficient representation), and frame encoder FE20 is configured to output the result of this quantization as LPC index XL. Such a quantizer typically includes a vector quantizer that encodes the input vector as an index to a corresponding vector entry in a table or codebook.

Frame encoder FE20 also includes an optional open-loop pitch search module OL10 that may be used to simplify pitch analysis and reduce the scope of the closed-loop pitch search in adaptive codebook search module AS10. Module OL10 may be implemented to filter the input signal through a weighting filter that is based on the unquantized LP filter coefficients, to decimate the weighted signal by two, and to produce a pitch estimate once or twice per frame (depending on the current rate). Module OL10 may be implemented, for example, as described in section 5.4 of 3GPP TS 26.190 v10.0.0.

Adaptive codebook (ACB) search module AS10 is configured to search the adaptive codebook (based on the past excitation and also called the "pitch codebook") to produce the delay and gain of the pitch filter. Module AS10 may be implemented to perform closed-loop pitch search around the open-loop pitch estimates on a subframe basis on a target signal (as obtained, e.g., by filtering the LP residual through a weighted synthesis filter based on the quantized and unquantized LP filter coefficients) and then to compute the adaptive codevector by interpolating the past excitation at the indicated fractional pitch lag and to compute the ACB gain. Module AS10 may also be implemented to use the LP residual to extend the past excitation buffer to simplify the closed-loop pitch search (especially for delays less than the subframe size of 64 samples). Module AS10 may be implemented to produce an ACB gain (e.g., for each subframe) and a quantized index that indicates the pitch delay of the first subframe (or the pitch delays of the first and third subframes, depending on the current rate) and relative pitch delays of the other subframes. Module AS10 may be implemented, for example, as described in section 5.7 of 3GPP TS 26.190 v10.0.0.

Fixed codebook (FCB) search module FS10 is configured to produce an index that indicates a vector of the fixed codebook (also called "innovation codebook," "innovative codebook," "stochastic codebook," or "algebraic codebook"), which represents the portion of the excitation that is not modeled by the adaptive codevector. Module FS10 may be implemented to produce the codebook index as a codeword that contains all of the information needed to reproduce the FCB vector (e.g., represents the pulse positions and signs), such that no codebook is needed. Module FS10 may be implemented, for example, as described in section 5.8 of 3GPP TS 26.190 v10.0.0.

Gain vector quantization module GV10 is configured to quantize the FCB and ACB gains, which may include gains for each subframe. Module GV10 may be implemented, for example, as described in section 5.9 of 3GPP TS 26.190 v10.0.0.

As an alternative to a codebook-based approach, a transform-based approach may be used to encode the LPC residual signal. For example, a modified discrete cosine transform (MDCT) may be used to encode the residual into parameters that include a set of MDCT coefficients, as in the Calliope superwideband codec (QUALCOMM Inc., San Diego, Calif.) and the TCX option of the AMR-WB+ codec. In another example, a transform-based approach is used to encode an audio signal without performing LPC analysis.

FIG. 5A shows a flowchart for a method M100 of audio signal processing according to a general configuration that includes tasks T200 and T300. Task T200 calculates at least one value of a decision metric for a second frame of the audio signal (the "subsequent frame" or "carrier frame") that is subsequent in the audio signal to a first frame (e.g., a critical frame) of the audio signal. Based on the at least one calculated value of the decision metric, task T300 selects one among a plurality of reallocation candidates, wherein the selected reallocation candidate indicates a reallocation of an initial bit allocation T for the subsequent frame into a first portion and a second portion. In a typical application, the first portion of the initial bit allocation T is then used to carry a copy of the subsequent frame, and the second portion of the initial bit allocation is used to carry a redundant copy of the critical frame.

It may be desirable to reduce the likelihood that the carrier frame will also be a critical frame (i.e., critical to another frame that is subsequent to it). Typically this likelihood is highest for the frame that immediately follows the critical frame and then decreases rapidly for subsequent frames. For voiced speech, it is typical that the onset frame in a talk spurt is critical and that the frame which immediately follows it is also critical (e.g., to cover the case when the onset frame is lost). However, it is also possible for another frame in a talk spurt to be critical (e.g., for a case in which the pitch lag drifts).

Figure 6A:
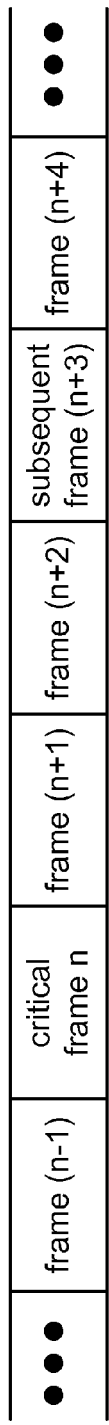
FIG. 6A shows an example of a sequence of frames of an audio signal.

A frame offset k may be used to indicate the distance between the critical frame and the carrier frame. In one such example, the value of frame offset k is the difference in frame number between the critical frame n and the carrier frame (n+k) (e.g., one more than the number of intervening frames). FIG. 6A shows a typical example in which the value of k is three. In another example, the value of k is four. Other possible values include one, two, three, five, and integers greater than five.

Method M100 may be implemented such that the offset k is fixed (e.g., during system implementation or during call set-up). The value of k may be selected according to the length of a frame (e.g. in milliseconds) in the original time-domain signal and a maximum allowable delay. For example, the value of k may be constrained by a maximum allowable value (e.g., to limit frame delay). It may be desirable for the maximum allowable delay to have a value of eighty or one hundred milliseconds. In such case, k may have a maximum value of four or five for a scheme using twenty-millisecond frames, or a maximum value of eight, nine, or ten for a scheme using ten-millisecond frames.

The value of offset k may also be selected and/or updated during a call according to channel conditions (e.g., as indicated by feedback from a receiver). For example, it may be desirable to use a higher value of k in an environment that is causing a frequent loss of consecutive frames (e.g., due to long fades).

Receiving terminal 104 may also feed channel state information 120 back to transmitting terminal 102. In one such example, receiving terminal 104 is configured to collect information relating to the quality of the transmission channel that carries the packets from transmitting terminal 102. Receiving terminal 104 may use the collected information to estimate the quality of the channel. The collected information and/or the channel quality estimate may then be fed back to transmitting terminal 102 as channel state information.

Figure 4:
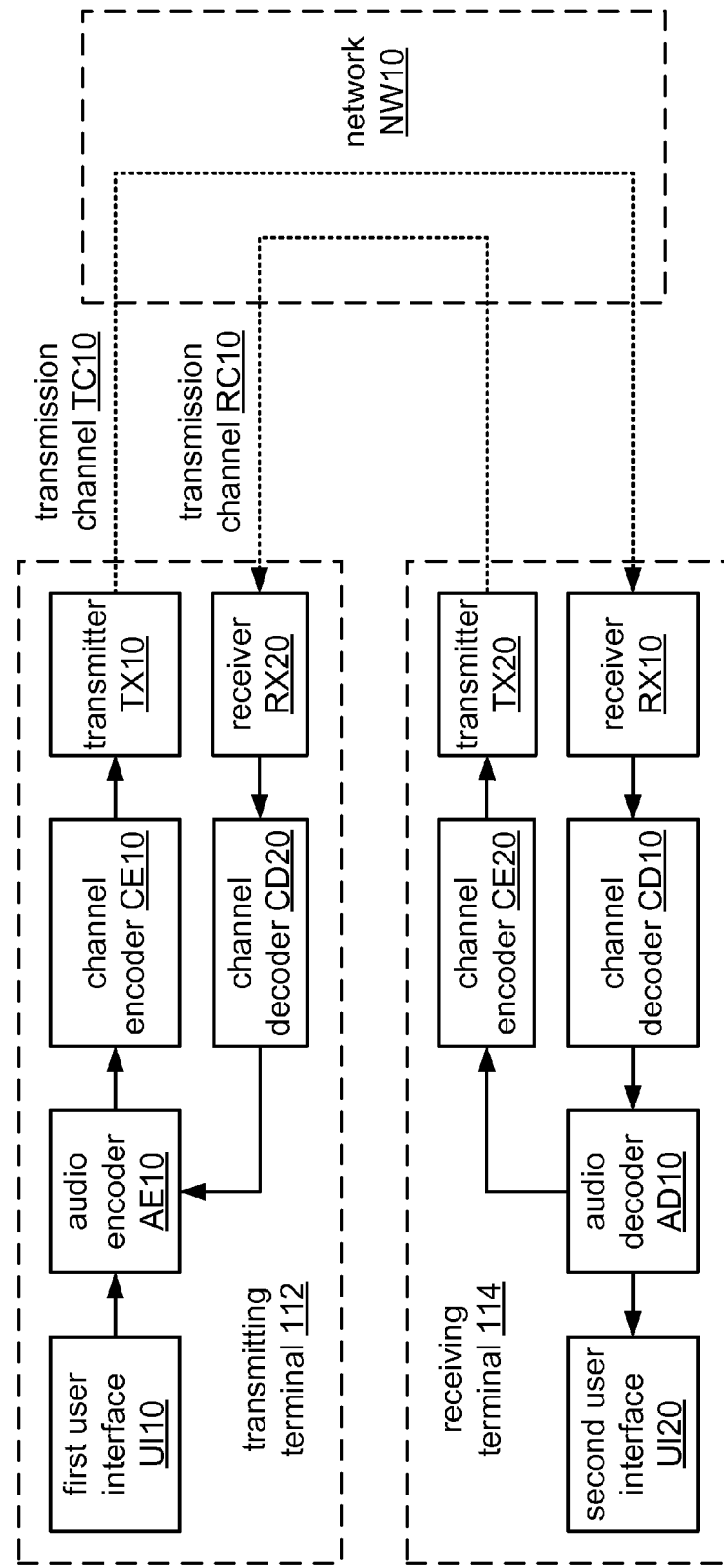
FIG. 4 is a block diagram illustrating an example of an implementation 112 of transmitting terminal 102 and an implementation 114 of receiving terminal 104.

FIG. 4 is a block diagram illustrating an example of an implementation 112 of transmitting terminal 102 and an implementation 114 of receiving terminal 104 that communicate over network NW10 via transmission channels TC10 and RC10. In this example, receiving terminal 114 includes an instance CE20 of channel encoder CE10 that may assemble the collected information and/or quality estimate (e.g., from audio decoder AD10) into a packet for transmission, via an instance TX20 of transmitter TX10 and transmission channel RC10, back to transmitting terminal 112, where the packet is received by an instance RX20 of receiver RX10 and disassembled by an instance CD20 of channel decoder CD10, and the information and/or estimate is provided to audio encoder AE10. Transmitting terminal 112 (e.g., audio encoder AE10) may use this channel state information to adapt one or more functions (e.g., an offset and/or a criticality threshold) that are associated with a sender-based packet-loss-resilient scheme as described herein.

The offset k indicates the length of an interval between the transmit time of the primary copy of a frame and the transmit time of the redundant copy of the frame. Usually the packet losses in a packet-switched network are bursty, and the burst lengths may be different under different network conditions. Thus, using a dynamically adjusted offset may result in better error-protection performance. An optimal offset may be estimated using the channel state information sent by the receiver. For example, the offset value can be adaptively adjusted (e.g., at run-time) based on the channel condition. Alternatively, the offset value may be predetermined.

In one example, task T200 calculates an open-loop decision metric D that is based on information from the frame. FIG. 5B shows a flowchart for an implementation M200 of method M100 that includes such an implementation T210 of metric calculation task T200. Task T210 may be implemented to calculate open-loop metric D as, for example, a measure of compressibility of the subsequent frame. Such a measure may be calculated as a correlation of subframes of the subsequent frame to one another (e.g., the maximum correlation over all possible lag values and all pairs (or all adjacent pairs) of subframes, or as an average of the maximum correlation over all possible lag values for each pair (or for each adjacent pair) of subframes). Such a measure may be considered to be a static measure of compressibility of the frame. One such example of the metric D is a measure $R_{ijp}$ of a correlation at lag p between two subframes $v_i$ and $v_j$ of length S, which may be calculated using an expression such as $$R_{ijp} = \frac{\sum_{i=0}^{S-p-1} v_i[i] v_j[i+p]}{\sqrt{\left[\sum_{i=0}^{S-p-1} (v_i[i])^2 \sum_{i=0}^{S-p-1} (v_j[i+p])^2\right]}}$$

In one such example, a twenty-millisecond frame is divided into three subframes of length 53, 53, and 54 samples, respectively. In another such example, a twenty-millisecond frame is divided into four five-millisecond subframes. Metric D may be selected such that, for example, a high value of D indicates a compressible frame and a low value of D indicates a frame that is resistant to compression.

Task T300 selects one among a plurality of reallocation candidates, based on the at least one calculated value of the decision metric. FIG. 5C shows a flowchart for an implementation M210 of method M200. Method M210 includes an implementation of task T300 as a loop that includes a comparison task T310 and is configured to loop through a set of threshold values $V_1$ to $V_M$. Task T310 compares the value of D to a current one of the set of threshold values. In this non-limiting example, the set of threshold values is ordered such that $V_q \leq V_{q+1}$ for all integers q from 1 to (M−1), and the loop is configured to start at the value $V_M$. In one example, the value of M is three, although other possible values include two, four, five, and integers greater than five.

Starting with a value of one for reallocation index m, the loop shown in FIG. 5C selects the value of m for which the value of D is not less than (alternatively, is greater than) the threshold value $V_m$. In a typical application, a copy of the subsequent frame and a redundant copy of the critical frame are encoded into the initial bit allocation T according to the reallocation candidate as indicated by the selected value of index m.

Each of the reallocation candidates indicates a distribution of an initial bit allocation among at least the subsequent frame and the critical frame. For example, each distribution $N_m$ may indicate a split of the initial bit allocation T into an allocation of $N_m$ bits to the critical frame and an allocation of (T−$N_m$) bits to the subsequent frame. In other cases, it is possible for a distribution to indicate an allocation of part of the total allocation of T bits to encode another frame and/or other information as well.

Figure 6C:
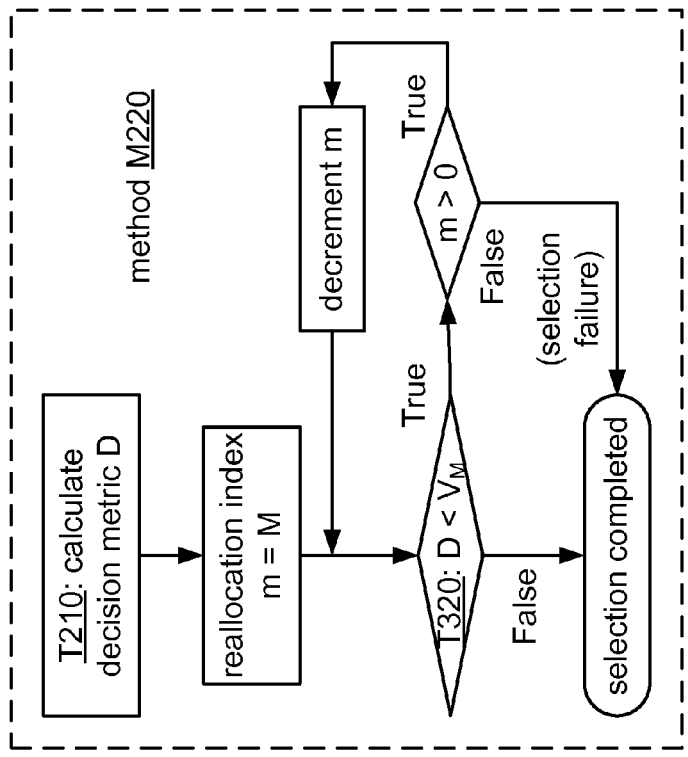
FIG. 6C shows a flowchart of an implementation M220 of method M200.
Figure 6B:
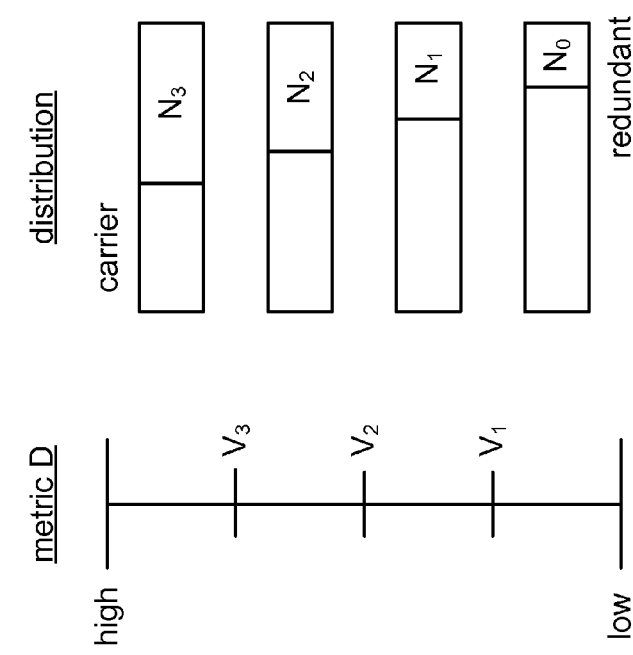
FIG. 6B shows a correspondence between ranges of the value of decision metric D and a plurality of reallocation candidates.

FIG. 6B shows ranges of the value of decision metric D, as defined by the threshold values $V_1$ to $V_M$, and a correspondence between each of these ranges and a different one of a plurality of distributions of the initial bit allocation T among a first (carrier) portion and a second (redundant) portion. In this example, each of the distributions is defined by a number $N_1$ to $N_M$, which may indicate a number of bits in the second portion or a bit rate for a frame to be encoded into the second portion (this example also includes a fallback distribution $N_0$ as discussed below). Metric D may be selected such that, for example, a high value of D indicates a compressible frame and a low value of D indicates a frame that is resistant to compression. In this case, for a value of D that indicates a compressible frame (i.e., a high value of D), a low rate (i.e., a small redundant portion) may be sufficient. For a value of D that indicates a frame that is resistant to compression (i.e., a low value of D in this example), a higher rate (i.e., a larger redundant portion) may be desired. In the non-limiting example of method M210, the set of reallocation candidates is ordered such that $N_p \leq N_{p+1}$ for all integers p from 1 to (M−1).

It is expressly noted that for most critical frames, the loop in method M210 may iterate fewer than M times. It may be desirable, for example, to implement method M200 (e.g., to select an appropriate decision metric and set of threshold values) such that for most critical frames, it will not be necessary for the method to execute for every threshold value in the set before a satisfactory reallocation candidate is identified.

If task T310 fails for all threshold values in the set, method M210 may determine that a redundant copy of the critical frame cannot be transmitted. Alternatively, method M210 may be implemented to include a fallback case as shown in FIG. 6B. FIG. 6C shows a flowchart for an implementation M220 of method M200 that has a loop, including an alternate implementation T320 of selecting task T300, which is configured to start with a value of M for reallocation index m. Method M220 may also be implemented to include a fallback case as shown in FIG. 6B.

It will be understood that the particular loop structures illustrated in FIGS. 5C and 6C, and the particular correspondence between ranges of the value of metric D and reallocations of the initial bit allocation, are examples only, and that any appropriate selection loop and any appropriate correspondence between the elements of an ordered set of decision metric threshold values $V_1$ to $V_M$ and corresponding elements of an ordered set of redundant portion reallocations $N_1$ to $N_M$ may be used. It is also noted that the open-loop example of decision metric D as described above is an example only, and that the disclosed principles of combining a decision metric to the reallocations may be applied to any decision metric (e.g., open-loop or closed-loop) which measures the perceptual quality impact of reducing the bit-rate of a carrier frame to accommodate a redundant copy of a critical frame.

It may be desirable to implement method M100 to select frame (n+k) (e.g., to select a value for offset k) based on information from one or more frames that are subsequent to the critical frame. In such case, it may be desirable to select frame (n+k) to minimize the perceptual quality impact in case the critical frame is not lost in the channel. For example, it may be desirable to select the most compressible subsequent frame as frame (n+k), subject to a maximum delay constraint K. FIG. 7A shows a flowchart for an implementation M300 of method M100 that includes an implementation T220 of metric calculation task T200. Task T220 calculates at least one value of the decision metric for each of a plurality of frames that are subsequent in the audio signal to the critical frame. Method M300 also includes an implementation T350 of task T300 that selects one among a plurality of reallocation candidates and one among the plurality of subsequent frames (e.g., by selecting the corresponding value of offset k).

FIG. 7B shows a flowchart for an implementation M310 of method M300. Method M310 includes an implementation of task T220 as a loop that includes a calculating task T230. Task T230 calculates a value of decision metric D as described herein for the frame indicated by the current value of offset k. Method M310 also includes an implementation of task T350 as a loop that includes a comparison task T330 and is configured to loop through a set of threshold values $V_1$ to $V_M$ in reverse order. In this non-limiting example, the set of threshold values is ordered such that $V_q \leq V_{q+1}$ for all integers q from 1 to (M−1), the loop that includes task T230 is configured to start at the value k=1, and the loop that includes task T330 is configured to start at the value $V_M$. If task T330 fails for all threshold values in the set, method M310 may determine that a redundant copy of the critical frame cannot be transmitted for offset k. If task T330 fails for all threshold values in the set and for all values of k, method M310 may determine that a redundant copy of the critical frame cannot be transmitted. Alternatively, method M310 may be implemented to include a default value of offset k (e.g., three or four) as a fallback.

It is expressly noted that for most critical frames, task T330 may compare a value of the decision metric to the M values of the set of threshold values for each of fewer than K frames. It may be desirable, for example, to implement method M300 (e.g., to select an appropriate decision metric and set of threshold values) such that for most critical frames, it will not be necessary for the method to execute for every one of the K subsequent frames before a satisfactory frame and reallocation candidate are identified. It is also possible to implement method M300 (e.g., M310) such that M is equal to one (e.g., only one threshold) and K is greater than one (e.g., multiple possible offsets).

It is contemplated that the same sets of threshold values and M reallocation candidates will be used for all of the frames of the plurality K of subsequent frames, but it is also possible to use a different set of threshold values and/or reallocation candidates for different subsequent frames (e.g., according to a speech mode and/or other characteristic of the subsequent frame), and in such case it is possible for each set of reallocation candidates to have a different respective number of elements M.

In another example, task T200 is implemented to calculate a set of values for a closed-loop decision metric. In this example, each calculated value is based on a dynamic measure of compressibility, such as a measure that is based on information from respective encoded versions of the subsequent frame. FIG. 8A shows a flowchart for an implementation M400 of method M100 that includes such an implementation T250 of metric calculation task T200. Task T250 may be implemented to calculate the decision metric based on, for example, a measure of perceptual quality. Such a metric may be calculated, for each reallocation candidate, as a measure of an associated change (e.g., reduction) in perceptual quality of the carrier frame. For example, such a metric may be calculated as a difference (e.g., an absolute difference) or a ratio between (A) a measure of perceptual quality of the carrier frame as encoded using the entire initial bit allocation T and (B) a measure of perceptual quality of the carrier frame as encoded using only the carrier portion of the initial bit allocation.

FIG. 8B shows a flowchart for an implementation M410 of method M400. Method M410 includes an implementation of task T250 as a loop that has a calculation subtask T260 and is configured to loop through a set of reallocation indices 1 to M. Task T260 calculates a value $D_m$ of the decision metric for frame (n+k) and the reallocation candidate indicated by the current index value. In this example, $D_m = |Q(T) - Q(T-N_m)|$, where Q(x) is a measure of perceptual quality of frame (n+k) as encoded using x bits. Such an example of measure $D_m$ may also be considered as a quality cost of the distribution $N_m$ for frame (n+k), and other such quality costs (e.g., relative to the quality of frame (n+k) as encoded using T bits) may also be used.

The compressibility measure Q(x) may be a full-reference metric, a no-reference metric, or a reduced-reference metric. Examples of measure Q(x) include perceptually weighted distortion measures (e.g., enhanced modified Bark spectral distance or EMBSD; a measuring normalizing blocks or MNB algorithm, as described e.g., in ITU-T Recommendation P.861); word-error-rate output of a speech recognizer (e.g., applying hidden Markov models) on the original and decoded signals; and a version of the E-model (e.g., as described in ITU-T Recommendations G.107 and G.108), which produces an R-value that may be mapped to an estimated mean opinion score (MOS). Other examples of metrics (e.g., objective metrics) that may be used for Q(x) include signal-to-noise ratio (SNR), perceptually weighted SNR (e.g., weighted using LP coefficients of frame (n+k)), segmented SNR, perceptually weighted segmented SNR, cepstral distance, and Bark spectral distance. Further examples of objective metrics that may be used for Q(x) include a perceptual speech quality measure (PSQM) (e.g., as described in ITU-T Recommendation P.861), a noise disturbance estimator as produced by such a measure, and other metrics as described in, e.g., ITU-T Recommendations P.861 and P.862 (e.g., PSQM and PSQM+; perceptual evaluation of speech quality, PESQ). In another example, decision metric $D_m$ is calculated as a SNR, or perceptually weighted SNR, in which the signal quantity is based on energy of frame (n+k) as decoded from a version encoded using T bits, and the noise quantity is based on energy of a difference between the signal quantity and frame (n+k) as decoded from a version encoded using $(T-N_m)$ bits.

Method M410 also includes an implementation of task T300 as a loop that has a comparison subtask T340 and is configured to loop through the calculated set of decision metric values $D_1$ to $D_M$. Task T340 compares a threshold value Z to a current one of the set of decision metric values. In this non-limiting example, the set of decision metric values is ordered such that $D_p \leq D_{p+1}$ for all integers p from 1 to (M−1). In one example, the value of M is three, although other possible values include two, four, five, and integers greater than five.

Starting with a value of one for reallocation index m, the loop which includes task T340 selects the first value of m for which the value of $D_m$ is not greater than (alternatively, is less than) the threshold value Z. Method M400 may be implemented to apply such a selection by encoding a copy of frame (n+k) and a redundant copy of the critical frame according to the reallocation candidate Nm. If task T340 fails for all threshold values in the set, method M410 may determine that a redundant copy of the critical frame cannot be transmitted. Alternatively, method M410 may be implemented to include a fallback case (e.g., a default reallocation).

It is expressly noted that for most critical frames, task T340 may compare fewer than all of the M values of the decision metric to the threshold value Z. It may be desirable, for example, to implement method M400 (e.g., to select an appropriate decision metric, threshold value, and set of reallocation candidates) such that for most critical frames, it will not be necessary for the method to test every one of the M values before a satisfactory reallocation for that frame are identified.

Figure 9B:
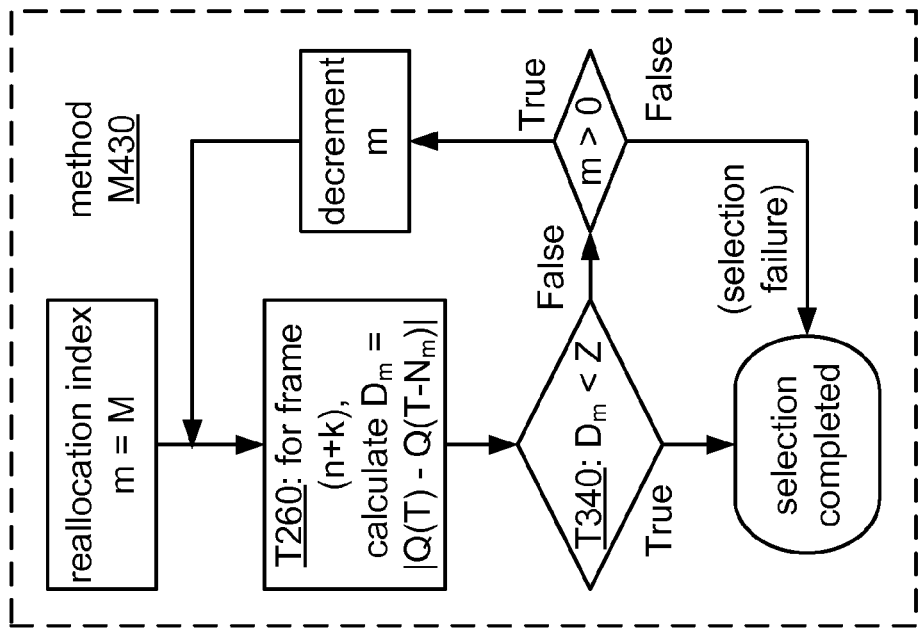
FIG. 9B shows a flowchart for an implementation M430 of method M400.
Figure 9A:
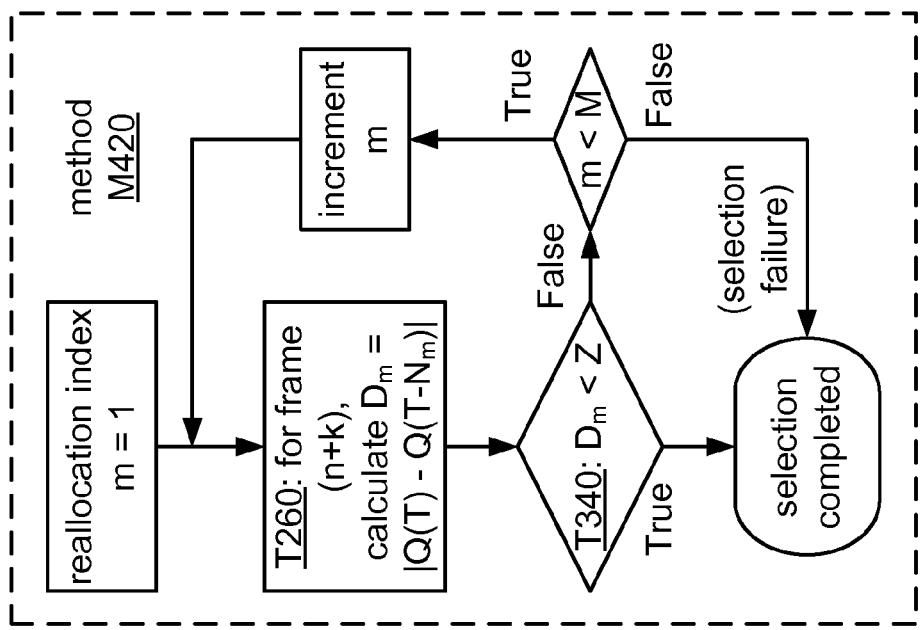
FIG. 9A shows a flowchart for an implementation M420 of method M400.

FIG. 9A shows a flowchart for an alternate implementation M420 of method M400 in which a single loop encompasses both of tasks T260 and T340. FIG. 9B shows a flowchart for an implementation M430 of method M400 that has an alternate loop structure which is configured to start with a value of M for reallocation index m. Methods M420 and M430 may also be implemented to include a fallback case (e.g., a default reallocation). It will be understood that the particular loop structures illustrated in FIGS. 8B, 9A, and 9B are examples only, and that any appropriate selection loop may be used to implement method M400.

In a similar manner as discussed herein with reference to method M300, it may be desirable to implement method M400 to select a value for offset k based on information from one or more frames that are subsequent to the critical frame. In such case, it may be desirable to determine an appropriate value for offset k to minimize the perceptual quality impact in case the critical frame is not lost in the channel. For example, it may be desirable to select a value for k to satisfy a change-of-quality threshold Z, subject to a maximum delay constraint K.

Figure 10B:
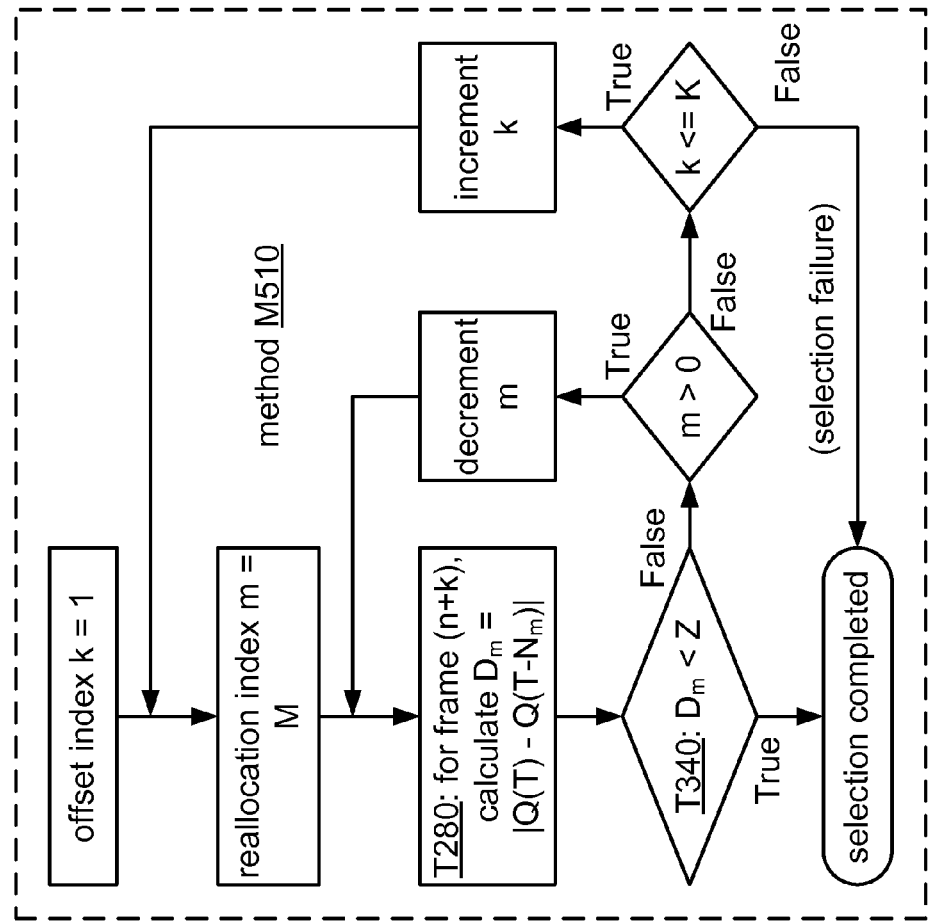
FIG. 10B shows a flowchart for an implementation M510 of method M500.
Figure 10A:
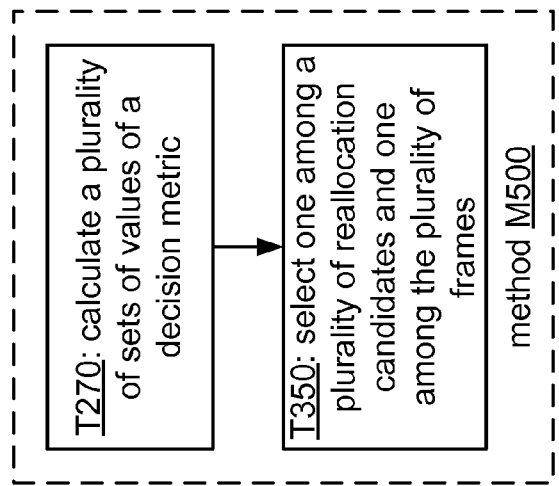
FIG. 10A shows a flowchart for an implementation M500 of method M400.

FIG. 10A shows a flowchart for such an implementation M500 of method M400 that includes an implementation T270 of metric calculation task T250. Task T270 calculates a set of values of the decision metric for each of a plurality of frames that are subsequent in the audio signal to the critical frame. Method M500 also includes an instance of task T350 that selects one among a plurality of reallocation candidates and one among the plurality of subsequent frames (e.g., by selecting the corresponding value of offset k).

FIG. 10B shows a flowchart for an implementation M510 of method M500. Method M510 includes an implementation of task T270 as a loop that includes an instance T280 of calculating task T260. This loop calculates a set of values $D_1$ to $D_M$ of the decision metric as described herein for the frame indicated by the current value of offset k. This loop also implements task T350 with an instance of comparison task T340 as described herein. In this non-limiting example, the loop is configured to initialize both of the offset index k and the reallocation index m with the value one.

It is contemplated that the same threshold value Z and the same set of M reallocation candidates will be used for all of the frames of the plurality K of subsequent frames, but it is also possible to use a different threshold value Z and/or a different set of reallocation candidates for different subsequent frames (e.g., according to a speech mode and/or other characteristic of the subsequent frame), and in such case it is possible for each set of reallocation candidates to have a different respective number of elements M.

It is expressly noted that for most critical frames, task T340 may compare each value $D_m$ of the decision metric to the threshold value Z for each of fewer than K subsequent frames. It may be desirable, for example, to implement method M500 (e.g., to select an appropriate decision metric, threshold value, and set of reallocation candidates) such that for most critical frames, it will not be necessary for the method to execute for every one of the K subsequent frames before a subsequent frame and a satisfactory reallocation for that frame are identified.

Figure 12:
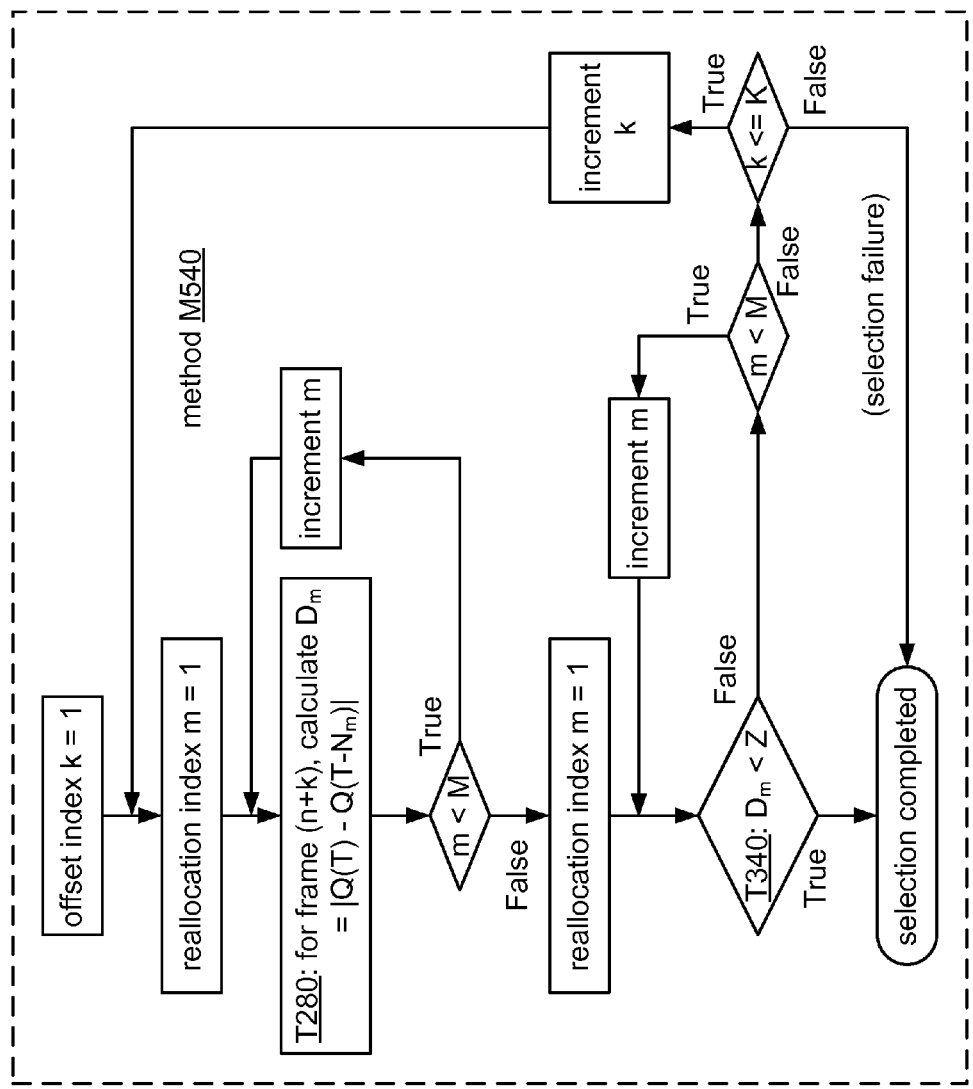
FIG. 12 shows a flowchart for an implementation M540 of method M500.

Method M510 may be implemented such that if task T340 fails for all reallocation candidates for a frame (n+k), the frame is encoded using T bits. If task T340 fails for all reallocation candidates over all candidate frames, method M510 may determine that a redundant copy of the critical frame cannot be transmitted. Alternatively, method M510 may be implemented to include default values of offset k (e.g., three or four) and reallocation index m as a fallback. FIGS. 11A, 11B, and 12 show flowcharts for similar implementations M520, M530, and M540, respectively, of method M500 that have alternate loop structures. In another non-limiting alternative, the loop structure of method M510 is reconfigured such that the inner loop iterates through values of k (e.g., frames) and the outer loop iterates through values of m (e.g., reallocation candidates).

Figure 13C:
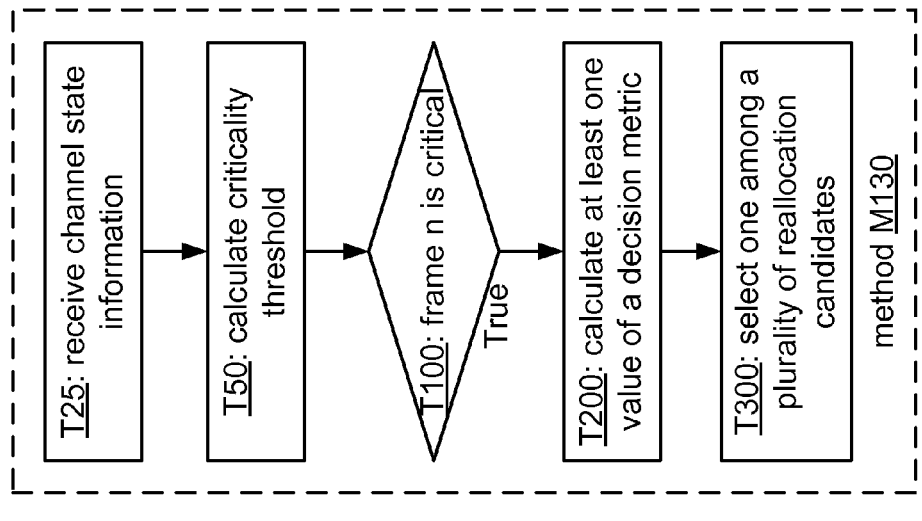
FIG. 13C shows a flowchart for an implementation M130 of method M120.

Method M100 may be performed in response to a determination that frame n is a critical frame. For example, it may be desirable to perform an instance of method M100 for each frame of the audio signal that is identified as being critical (i.e., important to the quality of the decoded signal under packet loss conditions). FIG. 13A shows a flowchart for an implementation M110 of method M100 that includes task T100, which identifies the critical frame.

Task T100 may be implemented to indicate that a frame of the signal is critical by calculating a value of a criticality measure for the frame and comparing the calculated value to a threshold value. Such a criticality measure may be based on information within the frame and may also be based on information from one or more frames that are adjacent and/or subsequent to the frame in the input signal. Task T100 may be implemented to indicate that the frame is critical when the calculated value exceeds (alternatively, is not less than) the threshold value, which may be based on a coding mode selected for the frame. Task T100 may be implemented to execute for each frame of the audio signal or only for certain frames (e.g., frames that are identified as voiced, or transient, or onset; frames that are initially assigned at least a minimum bit rate; etc.).

Task T100 may be implemented to calculate the criticality measure based on one or more criteria ranging from general characterizations of the frame to specific loss impact assessments. Such a measure may be based on information within the frame and may also be based on information from one or more frames that are adjacent and/or subsequent to the frame in the input signal.

A critical frame may be a frame that, when lost, may cause a significant quality degradation. Different critical frames may have different levels of criticalness. For example, for two critical frames n1 and n2, if frame (n1+1) (i.e., the frame next to frame n1) is highly predictable from frame n1 and frame (n2+1) (i.e., the frame next to frame n2) doesn't quite depend on frame n2, then frame n1 may be more critical than frame n2, because losing frame n1 may cause quality degradation over more than one frame.

Task T100 may be implemented to calculate the criticality measure based on an indication of the coding type of frame n (i.e., the coding process to be used to encode the frame) and possibly of each of one or more frames adjacent and/or subsequent to frame n. Examples of such a coding type may include code excited linear prediction (CELP), noise excited linear prediction (NELP), prototype waveform interpolation (PWI) or prototype pitch period (PPP), etc. Under this criterion, for example, a critical CELP frame may be considered to be more critical than a critical NELP frame.

Additionally or alternatively, task T100 may be implemented to calculate the criticality measure based on a speech mode of frame n (i.e., a classification of the speech content of the frame) and possibly of each of one or more frames adjacent and/or subsequent to frame n. Examples of speech mode may include voiced, unvoiced, silence, and transient. A classification of "voiced" may be further divided into onset and stationary. A classification of transient may be further divided into on-transient and off-transient. Under this criterion, for example, a voice onset frame (an initial frame in a talk spurt) may be more critical than a stationary voiced frame, as the encoding of subsequent frames in the talk spurt may rely heavily on information in the onset frame. In one example, task T100 is implemented to calculate the criticality measure to indicate a high degree of dependence in response to an indication that frame n is a speech onset frame and the subsequent frame (e.g., frame (n+1), (n+2), or (n+3)) is a stationary voiced frame.

Additionally or alternatively, task T100 may be configured to calculate the criticality measure based on one or more other properties of the frame n (and possibly of each of one or more frames adjacent and/or subsequent to frame n). For example, if the values of some important parameters for frame n differ significantly (e.g., more than some predetermined threshold) from the corresponding values for the preceding frame, then frame n may be a critical frame, since it may be not easily predicted from the frame that precedes it and loss of frame n may adversely affect subsequent frames that are more similar to frame n than to the preceding frame.

One example of such a property is an adaptive codebook (ACB) gain. A low ACB gain value for frame n may indicate that the frame differs significantly from the frame that precedes it, while a high ACB gain value for a frame subsequent to frame n (e.g., frame (n+1), (n+2), or (n+3)) may indicate that the frame is very dependent on frame n. In one example, task T100 uses information from frame n (e.g., an excitation signal) to generate an adaptive codevector for the subsequent frame and to calculate an ACB gain value for an encoded version of the subsequent frame. In this example, task T100 is implemented to calculate the criticality measure based on at least the calculated ACB gain value.

Another example of such a property is a perceptually weighted SNR (signal-to-noise ratio), which may be expressed in this case as $$C_n = \frac{\sum_{i=0}^{L-1} c_i^2}{\sum_{i=0}^{L-1} e_i^2},$$

where L is the frame length in samples, c is the perceptually weighted signal obtained by filtering the decoded version of frame n with a perceptual weighting filter $W(z)$, and e is a perceptually weighted error. Error e may be calculated, for example, as a difference between (A) a $W(z)$-filtered decoded version of frame n and (B) a $W(z)$-filtered error-concealed version of frame n (i.e., assuming the frame is not available at the decoder). The error-concealed version may be calculated based on information from previous frames according to a frame error concealment algorithm. For example, the error-concealed version may be calculated according to the procedure described in 3GPP TS 26.091, v.10.0.0 (April 2011, "Error concealment of lost frames," available from ETSI). In one example, $W(z)=A(z/\gamma)H(z)$, where $$A(z) = 1 + \sum_{i=1}^{p} a_i z^{-1},$$

$a_1$ to $a_p$ are the LPC filter coefficients for frame n, $\gamma=0.92$, and $H(z)=1/(1-0.68\ z^{-1})$. In an alternative example, error e is calculated by applying the filter $W(z)$ to the difference between the decoded and error-concealed versions.

Additionally or alternatively, task T100 may be configured to calculate the criticality measure as an estimate of an impact of the loss of frame n on the coding quality of one or more subsequent frames. For example, the criticality measure may be based on information from an encoded version of each of one or more frames subsequent to frame n (e.g., the adaptive codebook gain of frame n and/or of one or more of the subsequent frames). Additionally or alternatively, such a measure may be based on information of a decoded version of each of one or more frames subsequent to frame n (e.g., a perceptually weighted SNR of the decoded version), where the subsequent frame was encoded without using information of the frame n.

One example of such a measure for a frame (n+q) relative to frame n may be expressed as $$C_{n:n+q} = \frac{\sum_{i=0}^{L-1} c_i^2}{\sum_{i=0}^{L-1} e_i^2},$$

where L is the frame length in samples, c is the perceptually weighted signal obtained by filtering the decoded version of frame (n+q) with a perceptual weighting filter $W(z)$, and e is a perceptually weighted error. Error e may be calculated in this case, for example, as a difference between (A) a $W(z)$-filtered decoded version of frame (n+q) without loss of frame n and (B) a $W(z)$-filtered decoded version of frame (n+q) assuming an error-concealed version of frame n. The filter $W(z)$ may be calculated as described above using the LPC filter coefficients for frame (n+q). In an alternative example, error e is calculated by applying the filter $W(z)$ to the difference between the normally decoded and decoded-assuming-loss versions of frame (n+q).

Task T100 may be implemented to indicate only an active speech frame as a critical frame. Alternatively, task T100 may be implemented to consider non-speech frames as potentially critical frames. Typically, in two-way conversations, each party speaks for sometime during which a communication system transmits the party's speech (e.g., less than half of the time) and pauses for other times during which the communication system transmits silence or background noise. Infrequent transmission or discontinuous transmission (DTX) during the silence (or background noise) period has little impact on the perceptual quality of the conversation but provides the benefits of reducing intra-/inter-cell interference (therefore potentially increasing the system capacity) and conserving the battery power of a mobile unit used for the conversation.

A typical DTX scheme is realized by a speech encoder that uses voice activity detection (VAD). Using VAD, the encoder can distinguish active speech from background noise. In one such example, audio encoder AE10 (e.g., AE20) is implemented to encode each active speech segment (typically twenty milliseconds long) with a target bit rate packet for transmission and represents critical background noise segments (also twenty milliseconds long) with a relatively small size packet. This small packet may be a silence descriptor (SID) indicating silence. A critical background noise segment might be the background noise segment that immediately follows a talk spurt, or a background noise segment whose characteristics are significantly different from its precedent noise segments. Other types of background noise segments (or non-critical background noise segments) may be denoted with zero bits, or blanked, or not transmitted, or suppressed from transmission. When such a pattern of output packets (namely active segment(s), then critical background noise segment(s), then non-critical background noise segment(s)) purely depends on the input of the speech encoder, or the source, such a DTX scheme is called a source-controlled DTX scheme.

It may be desirable to perform a real-time voice communication between a terminal A (e.g., a transmitting user equipment or UE, such as terminal 102) and a terminal B (e.g., a receiving UE, such as terminal 104) over one or more packet-switched networks. Previous solutions, such as AMR and AMR-WB, adapt to bad channel conditions by reducing the bit rate (also called "rate adaptation"). For next-generation codecs for use in VoIP (Voice over Internet Protocol), reduction in bit rate may not help to reduce congestion in networks significantly (e.g., due to RTP overheads, where RTP is the Real-time Transport Protocol as described in, e.g., RFC 3550, Standard 64 (July 2003), Internet Engineering Task Force (IETF)). A method as disclosed herein may impart greater robustness to the vocoder and/or resolve codec performance issues due to channel impairment.

The quality of the communication channel from transmitting terminal A to receiving terminal B can be estimated by entities in the network (e.g., by a base transceiver station at the network end of the uplink radio channel, by a traffic analyzer in the core network, etc.) and/or by receiving terminal B (e.g., by analyzing the packet loss rate). It may be desirable to convey such information back to the transmitting UE using in-band messaging, through control signals (e.g., control packets using RTP Control Protocol (RTCP) as described in, e.g., RFC 1889 (January 1996, IETF)), and/or via another quality-of-service (QoS) feedback mechanism. Transmitting terminal A may be implemented to apply such information by switching to a mode of operation (i.e., a "channel-aware" mode) that is optimized for good performance under impaired channels. Also, the transmitting UE may be configured to select a channel-aware mode of operation at the call set-up time, if bad channel conditions can be anticipated (e.g., unmanaged networks).

A vocoder may be implemented to switch to a "channel-impairment robust mode" in response to an indication of bad channel conditions (e.g., packet errors, high jitter, etc.). In the "channel-impairment robust mode," the speech codec can choose to retransmit certain critical frames of the input signal either partially or entirely. For example, a speech coder operating in a "channel-impairment robust mode" may be configured to transmit a redundant copy of a frame if the criticality of the frame exceeds a certain pre-determined threshold. The criticality of a specific frame may be determined as a function of the perceptual impact of the loss of that frame on the decoded speech as estimated at the encoder. A channel-aware codec may be configured to switch between a channel-impairment robust mode and a normal mode of operation (i.e., in which no redundant copies are sent) in response to an indication of channel state.

Systems, methods, and apparatus as disclosed herein may be implemented to set the criticality threshold as a function of the channel quality estimate. For very good channels, the criticality threshold may be set very high. As the channel quality degrades, the criticality threshold may be lowered so that more frames are deemed critical.

Figure 13B:
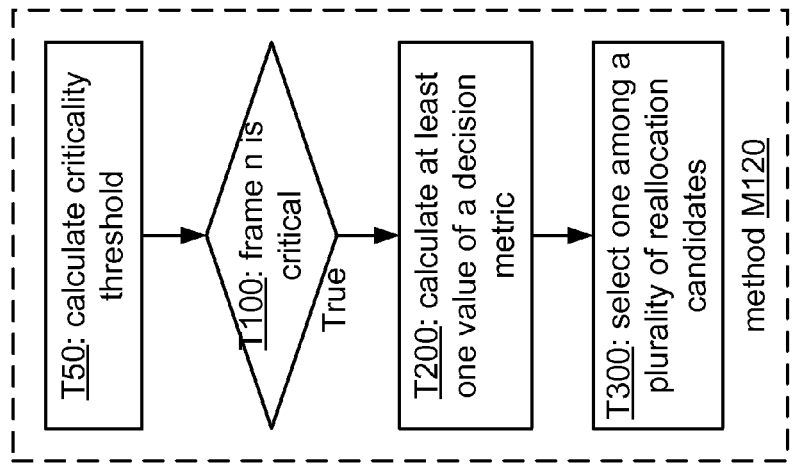
FIG. 13B shows a flowchart for an implementation M120 of method M110.
Figure 13A:
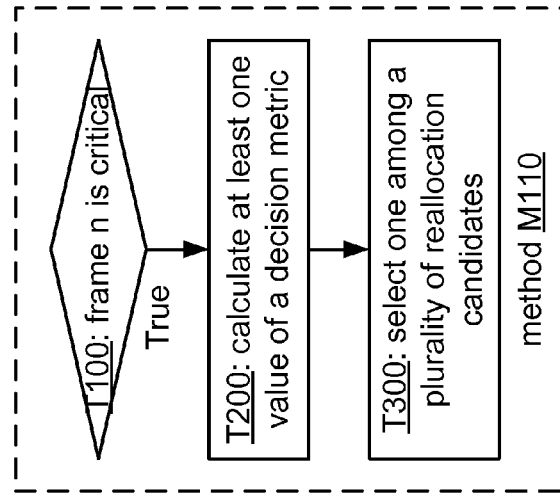
FIG. 13A shows a flowchart of an implementation M110 of method M100.

FIG. 13B shows a flowchart for an implementation M120 of method M110 that includes a task T50. Task T50 calculates a criticality threshold. Task T50 may be implemented to calculate the criticality threshold based on information relating to a state of a transmission channel. Such information may include one or more of the following measures, which may be updated for each of a series of time intervals: packet loss rate, packet loss fraction, number of packets expected, loss rate per second, received packet count, loss estimate validity (e.g., a weight measure based on a measure of the sample size, such as the number of packets expected for the interval), apparent throughput, and jitter.

Task T50 may also be configured to calculate more than one threshold, based on information relating to a state of the transmission channel. In such case, decision task T100 may be configured to use information from the frame (and/or one or more adjacent frames) to select the appropriate calculated threshold. For example, it may be desirable to use one criticality threshold to determine criticality of a frame that is determined to contain speech, and another criticality threshold to determine criticality of a frame that is determined to contain noise. In another example, different thresholds are used for transitional (e.g., onset) and stationary speech frames, and/or for voiced speech and unvoiced speech frames. For a case in which more than one criticality threshold is used, task T100 may be configured to select, from among two or more criticality measures, a criticality measure that corresponds to the threshold to be used for frame n.

The information that task T50 uses to calculate the threshold may include one or more of the following measures, which may be updated for each of a series of time intervals: packet loss rate, packet loss fraction, number of packets expected, loss rate per second, received packet count, loss estimate validity (e.g., a weight measure based on a measure of the sample size, such as the number of packets expected for the interval), apparent throughput, and jitter. As noted above, a receiver may be configured to convey such information back to the transmitting UE using in-band messaging, through control signals (RTCP messaging is an example of one such control signaling method), and/or via another quality-of-service (QoS) feedback mechanism. Examples of information that may be provided via RTCP messaging (Real-Time Transport Control Protocol, as defined in, e.g., the IETF specification RFC 3550) include transmitted octet counts, transmitted packet counts, expected packet counts, number and/or fraction of packets lost, jitter (e.g., variation in delay), and round-trip delay. FIG. 13C shows a flowchart for an implementation M130 of method M120 that includes a task T25 which receives channel state information (e.g., as described above).

FIGS. 14A and 14B show examples of relations between channel state information, the criticality threshold value that is based on that information, and the resulting likelihood that a frame will be indicated as critical. In the example of FIG. 14B, the reported quality of the channel is lower than the reported quality of the channel in FIG. 14A. Consequently, the criticality threshold value in FIG. 14B is less selective than the criticality threshold value in FIG. 14A, and the resulting likelihood that a frame will be indicated as critical is higher. If the reported quality of the channel becomes too low, the resulting likelihood that a frame will be indicated as critical may become too high.

It may be desirable to limit the number or proportion of frames that may be indicated as critical. For example, it may be desirable to balance improving performance under bad channel conditions against preserving native speech coding quality and/or arresting capacity loss due to retransmissions that may be triggered due to an overly inclusive criticality determination.

Figure 15B:
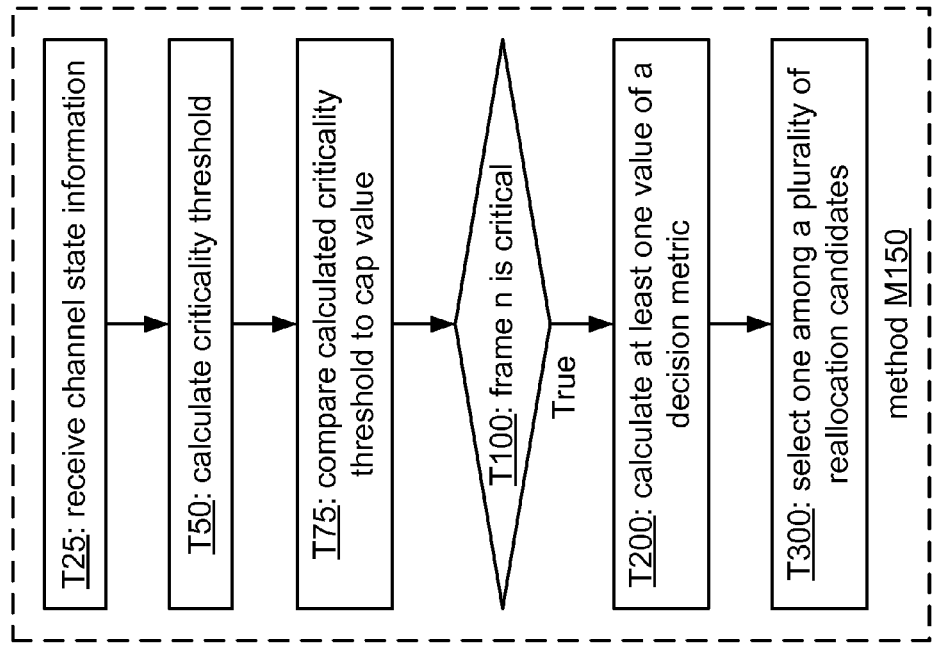
FIG. 15B shows a flowchart for an implementation M150 of methods M130 and M140.
Figure 15A:
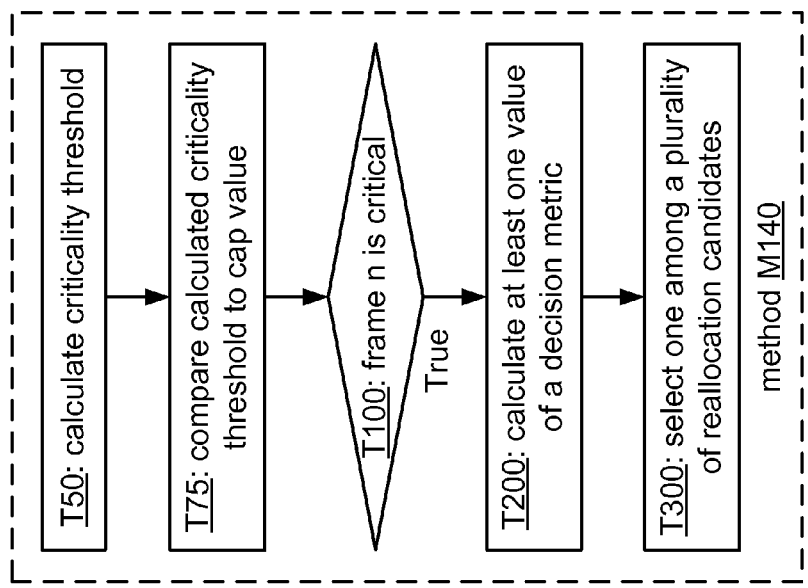
FIG. 15A shows a flowchart of an implementation M140 of method M120.

One approach to limiting retransmission frequency is to implement method M120 such that the threshold value is subject to a low cap value (i.e., a low boundary value, or a floor value) that sets a limit on how many frames may be retransmitted. For example, method M120 may be implemented to enforce a minimum value on the calculated threshold value. FIG. 15A shows a flowchart of such an implementation M140 of method M120 that includes a task T75. Task T75 compares a calculated candidate threshold value produced by task T50 to a boundary value (e.g., a low cap value). Based on a result of the comparison, task T75 selects one among (A) the calculated candidate threshold value and (B) the boundary value, such that task T75 produces the selected value as the calculated threshold value. For example, task T75 may be implemented to select the calculated candidate value if it is greater than (alternatively, not less than) the boundary value, and to select the boundary value otherwise. In such manner, task T75 may be configured to clip the calculated threshold value to the cap value. Task T75 may also be configured such that when the comparison fails (e.g., when clipping occurs), task T75 indicates such a condition to another module (e.g., for logging the condition, reporting the condition to the base station, and/or performing another remedial action).

Of course, it is also possible to implement task T100 alternatively such that the calculated value of the criticality measure is inversely proportional to criticality. In such case, task T100 may be configured to indicate that the frame is critical when the criticality measure is below (alternatively, fails to exceed) the calculated threshold value, and task T75 may be configured to compare (and possibly to clip) the calculated threshold value to a high cap value (i.e., a high boundary value, or a ceiling value). FIG. 15B shows a flowchart for an implementation M150 of methods M130 and M140 that includes tasks T25 and T75. It is expressly noted that task T100, possibly with one or more of tasks T25, T50, and T75 as described herein (e.g., any of T50+T100, T50+T75+T100, T25+T50+T100, and T25+T50+T75+T100), may be included in any of the other implementations of method M100 described herein (e.g., as tasks executing prior to task T200).

FIG. 16A shows a flowchart for an implementation M600 of method M100 that includes task T400. Task T400 produces a redundant copy of the critical frame, in accordance with the reallocation candidate selected in task T300. The redundant copy typically has fewer bits than the primary copy of the critical frame in the encoded signal (i.e., the copy of the critical frame as encoded normally) and may be used by a decoder to perform a forward error correction (FEC) operation to correct errors resulting from partial or complete loss of the primary copy. Task T400 may be implemented to produce the redundant copy prior to selection task T300 (e.g., as an input parameter to the decision metric calculation in an implementation of task T200 as task T250) or in response to selection of the reallocation candidate by task T300.

As noted above, the selected reallocation candidate may indicate the reallocation to the redundant copy as a number of bits or as a bit rate. FIG. 16B shows a flowchart for an implementation M610 of method M600 that includes an implementation T410 of task T400. Task T410 produces a redundant copy of the critical frame that has a length of $A_R$ bits (e.g., $N_m$ bits), as indicated by the selected reallocation candidate. FIG. 16C shows a flowchart for an implementation M620 of method M600 that includes an implementation T420 of task T400. Task T420 produces a redundant copy of the critical frame that is encoded at a rate $r_R$, as indicated by the selected reallocation candidate.

Typically it is desirable for the redundant copy to provide a good reference (e.g., a good adaptive codebook) that may be used for decoding subsequent frames. The redundant copy of the critical frame may include some of all of the parameters of the primary copy of the critical frame. Task T400 may be implemented to produce the redundant copy as a reduced version of the primary copy. For example, the primary copy may be an encoded version of the critical frame that includes components such as frequency envelope information (e.g., LPC or MDCT coefficients) and/or temporal envelope information (e.g., fixed codebook index, fixed codebook gain, adaptive codebook gain, pitch lag, and/or pitch gain for a CELP codec; prototype parameters and/or pitch information for a PWI or PPP codec). Task T400 may be implemented to produce the redundant copy to include a copy of part or all of each of one or more such components. For example, task T400 may be implemented to produce the redundant copy to include one or more codebook indices that identify quantized LPC filter parameters and/or quantized temporal envelope (e.g., excitation signal) parameters.

In such cases, task T400 may be implemented to assemble the redundant copy using (e.g., duplicating and/or condensing) components of a primary copy of the critical frame that have already been calculated. Task T400 may be implemented to produce a redundant copy in such manner to satisfy a bit constraint (e.g., as task T410) or in compliance with a structure associated with a rate constraint (e.g., as task T420). Such a structure may include a specified number of bits, for the frame or for each of one or more subframes of the frame, for each of a plurality of parameters, such as those mentioned above (i.e., LPC filter information, pitch delay, fixed/adaptive codebook index/gain, etc.).

Additionally or alternatively, task T400 may be implemented to produce part or all of the redundant copy by encoding the critical frame using a coding method that is different from the one used to produce the primary copy of the critical frame. In such a case, this different coding method will typically have a lower rate than the method used to produce the primary copy of the critical frame (e.g., using a lower-order LPC analysis, using a narrowband codec rather than a wideband codec, etc.). Such a different coding method may be a different bit rate and/or a different coding scheme (e.g., CELP for the primary copy and PPP or PWI for the redundant copy). FIG. 17A shows a flowchart for an implementation M630 of method M600 that includes an implementation T430 of task T400. Task T430 causes an encoder to produce a redundant copy of the critical frame. In one example, task T430 is implemented to provide the critical frame and the indicated allocation $N_m$ (e.g., as a number of bits, or as a bit rate) to the encoder.

FIG. 17B shows a flowchart for an implementation M640 of method M600 that includes an implementation T440 of task T400. Task T440 produces a copy of frame (n+k) and a redundant copy of critical frame n. Task T400 may include reallocating an initial bit allocation T for the subsequent frame into a first portion and a second portion, according to the selected reallocation candidate, and producing the copy of frame (n+k) and the redundant copy to fit into the respective portions (e.g., into $(T-N_m)$ and $N_m$ bits, respectively).

FIG. 17C shows a flowchart for an implementation M650 of method M600 that includes an implementation T450 of task T400. Task T450 encodes the copy of frame (n+k) into the first portion and encodes the redundant copy of critical frame n into the second portion.

In one example, the value of initial bit allocation T is 253, which corresponds to, e.g., a bit rate of 12.65 kbps (kilobits per second) and a frame length of twenty milliseconds. In another example, the value of T is 192, which corresponds to, e.g., a bit rate of 9.6 kbps and a frame length of twenty milliseconds.

Selection of one among a set of distributions of an allocation of T bits may be implemented as a change in the bit rate of the selected subsequent frame and selection of a low-bit-rate scheme to encode the redundant copy of the critical frame. For example, distributing the allocation of T bits as a portion of size $N_m$ bits to carry a redundant copy of the critical frame and a portion of size $(T-N_m)$ bits to carry a copy of the subsequent frame, where T=253 and $N_m$=61, may be implemented (e.g., within an AMR codec) by changing the bit rate of the subsequent frame from a starting bit rate of 12.65 kbps to a reduced bit rate of 9.6 kbps, encoding the subsequent frame according to an existing 9.6-kbps scheme, and using a 3.05-kbps scheme to encode a redundant copy of the critical frame.

It may be desirable to implement several such low-bit-rate schemes for redundant encoding, each one corresponding to a different one among the set of distributions. Examples of other starting bit rates include 8.85, 8.55, 6.6, 6.2, 4, 2.7, and 2 kbps, which correspond (e.g., for a frame length of twenty milliseconds) to values of T of 177, 171, 132, 124, 80, 54, and 40, respectively. Further examples of other starting bit rates include 23.85, 23.05, 19.85, 18.25, 15.85, 14.25, and 12.65 kbps, which correspond (e.g., for a frame length of twenty milliseconds) to values of T of 477, 461, 397, 365, 317, 285, and 253, respectively. A frame may be encoded according to such a rate as described, for example, in Release 10 of the AMR-WB codec referenced herein (e.g., using a CELP coding model).

The principles described herein may be applied to single-fixed-bit-rate schemes in which each frame receives the same initial bit allocation T. These principles may also be applied to variable-bit-rate schemes (e.g., multi-mode or multiple-fixed-bit-rate schemes) in which the total frame allocation of T bits may change from one frame to another. For example, the number of bits T available to encode frame (n+k) may vary according to whether the frame contains speech or noise, or according to whether the frame contains voiced speech or unvoiced speech, etc.

Methods M300 and M500 may be implemented to include encoding at least one of the plurality of subsequent frames (e.g., a non-carrier frame) using T bits. Such methods may even include encoding each of the non-carrier ones of the plurality of subsequent frames using T bits. However, it is also possible for the audio signal to include two adjacent critical frames, or two critical frames that are otherwise close to one another, such that the set of K subsequent frames relative to one critical frame overlaps (i.e., has at least one frame in common with) the set of K subsequent frames relative to the other critical frame. In such a case, one of the common subsequent frames may be selected to carry a redundant copy of one critical frame, and another of the common subsequent frames may be selected to carry a redundant copy of the other critical frame, such that each of these two subsequent frames is encoded using less than T bits. It is also possible that a selected subsequent frame may itself be a critical frame. In some cases, for example, it may be expected that the set of K subsequent frames relative to a critical frame may include at least one other critical frame about twenty percent of the time.

Task T400 may be implemented to produce the copy of frame (n+k) prior to selection task T300 (e.g., as an input parameter to the decision metric calculation in task T250) or in response to selection of the reallocation candidate by task T300. FIG. 18A shows a flowchart for an implementation M660 of method M610 that includes tasks TA10 and TB10. Task TA10 receives an indication of initial bit allocation T as a number of bits $A_o$ allotted to frame (n+k). Task TB10 encodes the copy of frame (n+k) into $A_1$ bits (e.g., $(T-N_m)$ bits), where $A_1$ is less than $A_0$. Method M660 also includes an instance of task T250 that is arranged to receive information from the copy of frame (n+k) encoded in task TB10 as an input parameter. For example, task T250 may be implemented to use the copy of frame (n+k) to calculate one or more values of a change-of-quality decision metric as described herein.

FIG. 18B shows a flowchart for an implementation M670 of method M620 that includes tasks TA20 and TB20. Task TA20 receives an indication of initial bit allocation T as a rate selection $r_0$ for frame (n+k). Task TB20 encodes the copy of frame (n+k) according to a rate $r_1$ that is lower than $r_0$. Method M670 also includes an instance of task T250 that is arranged to receive information from the copy of frame (n+k) encoded in task TB20 as an input parameter. For example, task T250 may be implemented to use the copy of frame (n+k) to calculate one or more values of a change-of-quality decision metric as described herein.

FIG. 18C shows a flowchart for an implementation M700 of method M600 that includes a task T500. Task T500 produces a packet that contains a copy of subsequent frame (n+k) and the redundant copy of critical frame n as produced by task T400. FIG. 19A shows a flowchart for an implementation M710 of methods M610 and M700. FIG. 19B shows a flowchart for an implementation M720 of methods M620 and M700. It may be desirable for the packet to include information indicating that it carries a redundant copy of the critical frame, indicating the value of the offset k, and/or indicating the number of reallocated bits $N_m$. Alternatively, such information may be derivable by the decoder from other information in the encoded signal.

Figures 20A, 20B, 20C:
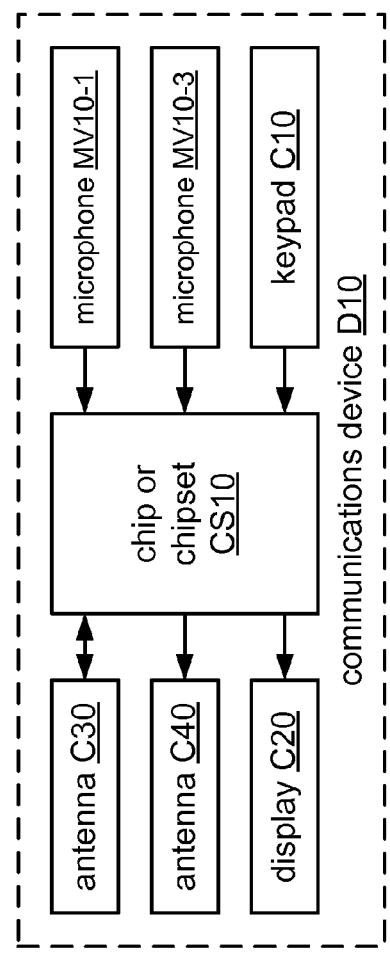
FIG. 20A is a diagram of an IPv4 packet.
FIG. 20B is a diagram of an IPv6 packet.
FIG. 20C shows a block diagram of a communications device D10.

A packet may include one or more frames. It may be desirable to limit packet length to 20 milliseconds (e.g., to reduce lag). FIG. 20A shows an example of the overhead for a packet encoded using a typical protocol stack for VoIP communications that includes Internet Protocol version 4 (IPv4), User Datagram Protocol (UDP), and RTP. FIG. 20B shows a similar example for an IP version 6 (IPv6) packet. Examples of payload size include 160 bytes for a G.711 codec, 20 bytes for a G.729 codec, and 24 bytes for a G.723.1 codec. Other codecs that may be used with a method for bit reallocation for redundant encoding as described herein include, without limitation, G.726, G.728, G.729A, AMR, AMR-WB, AMR-WB+ (e.g., as described in 3GPP TS 26.290 v10.0.0, March 2011), VMR-WB (3GPP2 C.S0052-0, Service Options 62 and 63), the Enhanced Variable Rate Codec (EVRC, as described in the Third Generation Partnership Project 2 (3GPP2) document C.S0014-C, v1.0, entitled "Enhanced Variable Rate Codec, Speech Service Options 3, 68, and 70 for Wideband Spread Spectrum Digital Systems," February 2007 (available online at www-dot-3gpp-dot-org)), the Selectable Mode Vocoder speech codec (as described in the 3GPP2 document C.S0030-0, v3.0, entitled "Selectable Mode Vocoder (SMV) Service Option for Wideband Spread Spectrum Communication Systems," January 2004 (available online at www-dot-3gpp-dot-org)), and the Enhanced Voice Service codec (EVS, e.g., as described in 3GPP TR 22.813 v10.0.0 (March 2010), available from ETSI).

FIG. 21 shows an example of a payload for an RTP packet that carries a redundant copy of a critical frame and a copy of a frame that is subsequent to the critical frame. The redundant copy (bits r(0) to r(176)) is encoded at the AMR-WB 8.85 kbps mode, as indicated by the value of one for the corresponding frame type indicator FT, and the copy of the subsequent frame (bits p(0) to p(131)) is encoded at the AMR-WB 6.6 kbps mode, as indicated by the value of zero for the corresponding frame type indicator FT. In this example, the codec mode request indicator CMR requests the encoder at the receiving terminal to adopt the 8.85 kbps mode, and the payload ends with three padding bits P to fill out the last octet. In other examples, the payload may contain more than two encoded frames, and/or the bits of the redundant copy may precede the bits of the copy of the subsequent frame in the packet (with the order of the corresponding table-of-contents entries for the copies being switched accordingly).

It may be desirable to use header compression: for example, to compress the RTP header from twelve bytes down to four bytes. The RTP header includes a timestamp, which may be used to calculate transmission time, and a sequence number, which may be used to correctly present packets that are received out of order and/or to detect packet loss. Robust Header Compression (ROHC; as described in IETF RFC 3095, RFC 3843, and/or RFC 4815) may be used to support greater compression rates (e.g., compression of one or more, and possibly all, packet headers down to one to four bytes).

Figure 22:
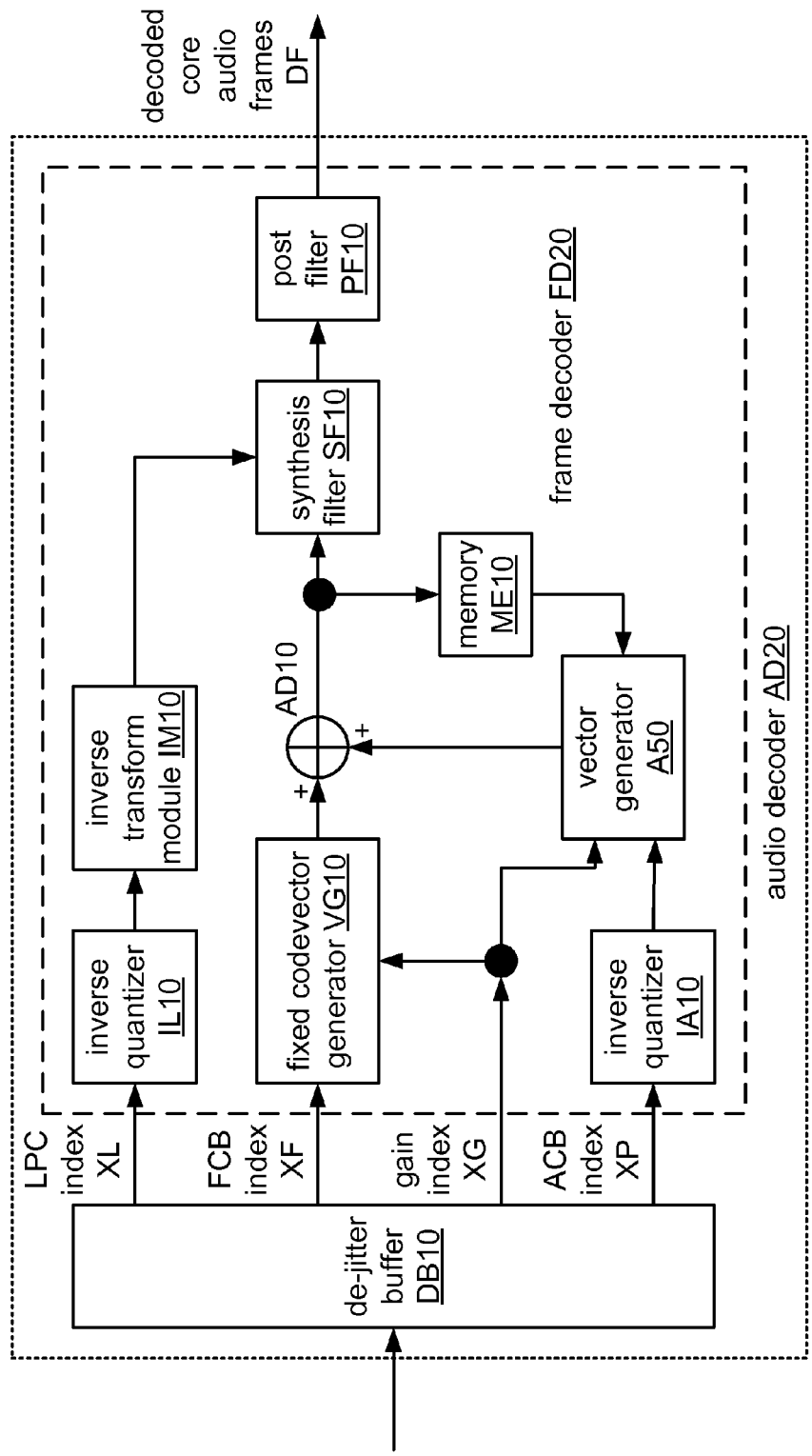
FIG. 22 is a block diagram of an implementation AD20 of audio decoder AD10.

FIG. 22 is a block diagram of an implementation AD20 of audio decoder AD10. Audio decoder AD20 may be implemented as part of a vocoder, as a stand-alone entity, or distributed across one or more entities within receiving terminal 104. Audio decoder AD20 may also be implemented as part of a VoIP client.

Audio decoder AD20 will be described below in terms of its functionality. Audio decoder AD20 may be implemented as hardware, firmware, software, or any combination thereof, and the manner in which it is implemented may depend on the particular application and the design constraints imposed on the overall system. By way of example, audio decoder AD20 may be implemented with a microprocessor, digital signal processor (DSP), programmable logic, dedicated hardware or any other hardware- and/or software-based processing entity.

In this example, audio decoder AD20 includes a de-jitter buffer DB10 (also called a "jitter buffer"). De-jitter buffer DB10 may be a hardware device or software process that reduces or eliminates jitter caused by variations in packet arrival time (due, for example, to network congestion, timing drift, and/or route changes). De-jitter buffer DB10 may receive audio frames in packets. De-jitter buffer DB10 may be implemented to delay newly-arriving packets so that the frames of the previously-arrived packets can be continuously provided to frame decoder FD20, in the correct order (e.g., as indicated by the timestamps of the packets), resulting in a clear connection with little audio distortion. De-jitter buffer DB10 may be fixed or adaptive. A fixed de-jitter buffer may introduce a fixed delay to the packets. An adaptive de-jitter buffer, on the other hand, may adapt to changes in the network's delay. De-jitter buffer DB10 may provide encoded audio frames (e.g., including indices XL, XF, XG, and XP) to frame decoder FD20 in appropriate order.

If a copy of a frame is not received by the de-jitter buffer, a frame loss may be caused if the FEC is not used. When FEC is used and the copy of the current to-be-played frame is lost, de-jitter buffer DB10 may determine whether there is a redundant copy of the frame in the buffer. If a redundant copy for the current frame is available, the redundant copy may be provided to frame decoder FD20 for decoding to generate audio samples.

In addition, de-jitter buffer DB10 may be modified to process a primary frame (i.e., the original critical frame) and a redundant frame (i.e., a copy of some or all of the original critical frame) differently. Buffer DB10 may process these two frames differently so that the average delay associated with implementing an FEC operation as described herein is no larger than the average delay when the FEC operation is not implemented. For example, buffer DB10 may be implemented to detect that an incoming packet contains a redundant copy (e.g., that the packet contains two frames) and to initiate decoding of the redundant copy in response to this detection.

The audio frames released from de-jitter buffer DB10 may be provided to frame decoder FD20 to generate decoded core audio frames DF (e.g., synthesized speech). In general, frame decoder FD20 may be implemented to perform any method of decoding speech into synthesized speech known in the art. In the example of FIG. 22, frame decoder FD20 uses a CELP decoding method that corresponds to the encoding method described above with reference to FIG. 3. In this example, fixed codevector generator VG10 decodes FCB index XF and a corresponding portion of gain index XG to produce fixed codevectors for each sub-frame, inverse quantizer IA10 and vector generator A50 decode ACB index XP and a corresponding portion of gain index XG to produce adaptive codevectors for each sub-frame, and adder AD10 combines the corresponding codevectors to produce the excitation signal and to update memory ME10 (e.g., as described in steps 1-8 of section 6.1 of 3GPP TS 26.190 v10.0.0). Inverse quantizer IL10 and inverse transform module IM10 decode LPC index XL to produce LP filter coefficient vectors, which are applied to the excitation by synthesis filter SF10 to produce a synthesized signal (e.g., as described in the initial paragraph and step 4 of section 6.1 of 3GPP TS 26.190 v10.0.0). The raw synthesized signal is provided to post-filter PF10, which may be implemented to perform operations such as high-pass filtering, upscaling, and interpolation (e.g., as described in section 6.2 of 3GPP TS 26.190 v10.0.0) to produce the decoded core audio frames DF. Alternatively, and without limitation, frame decoder FD20 may use NELP or PPP full-frame decoding methods.

Redundant copies of frames that include some (i.e., a partial set) of the parameter values of the primary copy may be passed from de-jitter buffer DB10 to a partial frame decoding module. For example, frame decoder FD20 may be implemented to generate a frame corresponding to the critical frame (e.g., according to an error concealment procedure as described in 3GPP TS 26.091, v.10.0.0 as referenced above) before the redundant copy is available. In this case, frame decoder FD20 may include a partial frame decoding module that is configured to update memory ME10 (e.g., according to fixed and adaptive codebook indices and gains from the redundant copy) before decoding the carrier frame (n+k).

In one configuration, the copy of the subsequent frame (n+k) and the redundant copy of the critical frame n are packetized into RTP packets and transmitted to receiving terminal 104. In another configuration, the copy of the subsequent frame and the redundant copy of the critical frame, although they may be generated at the same time, are packed into different corresponding RTP packets and transmitted to the receiving terminal. The decision of which format to use may be based on the capabilities of both terminals. If both formats are supported in each terminal, for example, the format supporting a lower data rate may be used.

At the receiver side, the speech frames may be stored in de-jitter buffer DB10, which may be adaptive. As previously mentioned, de-jitter buffer DB10 may be designed so that the average delay for speech frames is no larger than the average delay without FEC techniques. The frames may be sent to a frame decoder (e.g., decoder FD20) in the proper order from de-jitter buffer DB10. If the redundant copy is a partial set of the parameters of the primary copy, a partial frame decoding module may be used.

A source-controlled (and possibly channel-controlled) FEC scheme as described herein may reduce the number of packet losses and the burstiness of the losses with little or no increase in the data rate. Critical frame identification may help to ensure a good trade-off between speech perceptual quality and the data rate. Such an FEC scheme may be implemented to use the available bandwidth efficiently and to be backward compatible with legacy communication devices.

Audio encoder AE10 may be implemented to include a dynamic rate control module. Such a module may implement two steps to approach a predetermined target rate. In the first step, two adjacent operating points are determined. These two adjacent operating points, which may be data rates, are chosen so that the value of the target data rate is between the values of the two operating points. The target data rate may be specified externally based on the capacity demands. Alternatively, the target data rate may be specified internally based on, for example, the channel state information. Such rate control may be implemented to allow an FEC scheme as described herein to be carried out at any specified data rate, so that operators may decide the data rate based on capacity demand.

FIG. 23A shows a block diagram of an apparatus MF100 according to a general configuration. Apparatus MF100 includes means F200 for calculating at least one value of a decision metric, based on information from a frame of the audio signal that is subsequent in the audio signal to a critical frame of the audio signal (the "subsequent frame" or "carrier frame") (e.g., as described herein with reference to task T200). Apparatus MF100 also includes means F300 for selecting one among a plurality of reallocation candidates, wherein the selected reallocation candidate indicates a reallocation of an initial bit allocation T for the subsequent frame into a first portion and a second portion (e.g., as described herein with reference to task T300).

FIG. 23B shows a block diagram of an implementation MF300 of apparatus MF100. Apparatus MF300 includes an implementation F220 of means F200 that is for calculating at least one value of a decision metric for each of a plurality of frames (e.g., as described herein with reference to task T220). Apparatus MF300 also includes an implementation F350 of means F300 that is for selecting one among a plurality of reallocation candidates and one among the plurality of frames (e.g., by selecting the corresponding value of offset k, as described herein with reference to task T350).

FIG. 23C shows a block diagram of an implementation MF500 of apparatus MF100. Apparatus MF500 includes an implementation F270 of means F200 that is for calculating a plurality of sets of values of a decision metric (e.g., as described herein with reference to task T270). Apparatus MF500 also includes an instance of means F350.

FIG. 24A shows a block diagram of an implementation MF140 of apparatus MF100. Apparatus MF140 includes means F50 for calculating a criticality threshold (e.g., as described herein with reference to task T50), means F75 for comparing the calculated criticality threshold to a cap value (e.g., as described herein with reference to task T75), and means F100 for determining that frame n is critical (e.g., as described herein with reference to task T100).

FIG. 24B shows a block diagram of an implementation MF150 of apparatus MF140. Apparatus MF140 includes means F25 for receiving channel state information (e.g., as described herein with reference to task T25). As described herein, the channel state information, which may indicate the quality of the channel used for transmissions between the transmitting terminal 102 and the receiving terminal 104, may be collected and estimated at the receiving terminal 104 and transmitted back to the transmitting terminal 102.

FIG. 25A shows a block diagram of an apparatus A100 according to a general configuration that includes a calculator 200 and a selector 300. Calculator 200 is configured to calculate at least one value of a decision metric, based on information from a frame of the audio signal that is subsequent in the audio signal to a first frame of the audio signal (e.g., as described herein with reference to task T200). Selector 300 is configured to select one among a plurality of reallocation candidates, based on the at least one calculated value of the decision metric (e.g., as described herein with reference to task 300), wherein the selected reallocation candidate indicates a reallocation of an initial bit allocation T for the subsequent frame into a first portion and a second portion. Apparatus A100 may also be implemented to include a frame encoder configured to produce a redundant copy of the first frame (e.g., frame encoder FE20), a packet assembler configured to produce a packet containing a copy of the subsequent frame and the redundant copy (e.g., as described herein with reference to task T500), and/or a critical frame indicator configured to determine that the first frame is a critical frame (e.g., as described herein with reference to task T100).

FIG. 25B shows a block diagram of an implementation A300 of apparatus A100. Apparatus A300 includes an implementation 220 of calculator 200 that is configured to calculate at least one value of a decision metric for each of a plurality of frames (e.g., as described herein with reference to task T220). Apparatus A300 also includes an implementation 350 of selector 300 that is configured to select one among a plurality of reallocation candidates and one among the plurality of frames (e.g., by selecting the corresponding value of offset k, as described herein with reference to task T350).

FIG. 25C shows a block diagram of an implementation A500 of apparatus A100. Apparatus A500 includes an implementation 270 of calculator 200 that is configured to calculate a plurality of sets of values of a decision metric (e.g., as described herein with reference to task T270). Apparatus A500 also includes an instance of selector 350.

FIG. 20C shows a block diagram of a communications device D10 that includes a chip or chipset CS10 (e.g., a mobile station modem (MSM) chipset) that embodies the elements of apparatus A100 (or MF100). Chip/chipset CS10 may include one or more processors, which may be configured to execute a software and/or firmware part of apparatus A100 or MF100 (e.g., as instructions). Transmitting terminal 102 may be realized as an implementation of device D10.

Chip/chipset CS10 includes a receiver (e.g., RX10), which is configured to receive a radio-frequency (RF) communications signal and to decode and reproduce an audio signal encoded within the RF signal, and a transmitter (e.g., TX10), which is configured to transmit an RF communications signal that describes an encoded audio signal (e.g., as produced by task T500). Such a device may be configured to transmit and receive voice communications data wirelessly via any one or more of the codecs referenced herein.

Device D10 is configured to receive and transmit the RF communications signals via an antenna C30. Device D10 may also include a diplexer and one or more power amplifiers in the path to antenna C30. Chip/chipset CS10 is also configured to receive user input via keypad C10 and to display information via display C20. In this example, device D10 also includes one or more antennas C40 to support Global Positioning System (GPS) location services and/or short-range communications with an external device such as a wireless (e.g., Bluetooth™) headset. In another example, such a communications device is itself a Bluetooth™ headset and lacks keypad C10, display C20, and antenna C30.

Figure 26:
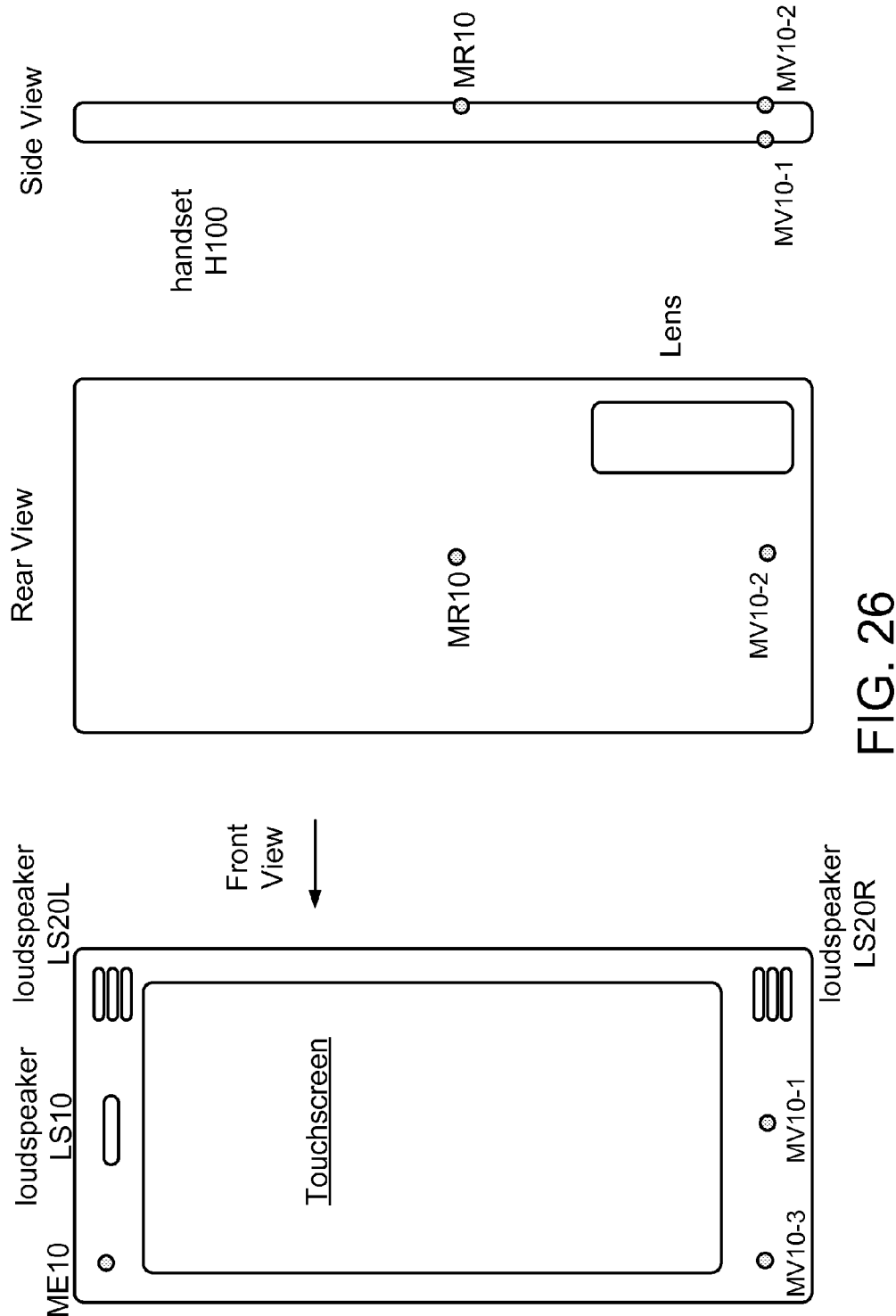
FIG. 26 shows front, rear, and side views of a handset H100.

Communications device D10 may be embodied in a variety of communications devices, including smartphones and laptop and tablet computers. FIG. 26 shows front, rear, and side views of one such example: a handset H100 (e.g., a smartphone) having two voice microphones MV10-1 and MV10-3 arranged on the front face, a voice microphone MV10-2 arranged on the rear face, another microphone ME10 (e.g., for enhanced directional selectivity and/or to capture acoustic error at the user's ear for input to an active noise cancellation operation) located in a top corner of the front face, and another microphone MR10 (e.g., for enhanced directional selectivity and/or to capture a background noise reference) located on the back face. A loudspeaker LS10 is arranged in the top center of the front face near error microphone ME10, and two other loudspeakers LS20L, LS20R are also provided (e.g., for speakerphone applications). A maximum distance between the microphones of such a handset is typically about ten or twelve centimeters.

FIG. 25D shows a block diagram of a wireless device 1102 that may be implemented to perform a method as described herein (e.g., any one or more of methods M100, M200, M300, M400, M500, M600, and M700). Transmitting terminal 102 may be realized as an implementation of wireless device 1102. Wireless device 1102 may be a remote station, access terminal, handset, personal digital assistant (PDA), cellular telephone, etc.

Wireless device 1102 includes a processor 1104 which controls operation of the device. Processor 1104 may also be referred to as a central processing unit (CPU). Memory 1106, which may include both read-only memory (ROM) and random access memory (RAM), provides instructions and data to processor 1104. A portion of memory 1106 may also include non-volatile random access memory (NVRAM). Processor 1104 typically performs logical and arithmetic operations based on program instructions stored within memory 1106. The instructions in memory 1106 may be executable to implement the method or methods as described herein.

Wireless device 1102 includes a housing 1108 that may include a transmitter 1110 and a receiver 1112 to allow transmission and reception of data between wireless device 1102 and a remote location. Transmitter 1110 and receiver 1112 may be combined into a transceiver 1114. An antenna 1116 may be attached to the housing 1108 and electrically coupled to the transceiver 1114. Wireless device 1102 may also include (not shown) multiple transmitters, multiple receivers, multiple transceivers and/or multiple antennas.

In this example, wireless device 1102 also includes a signal detector 1118 that may be used to detect and quantify the level of signals received by transceiver 1114. Signal detector 1118 may detect such signals as total energy, pilot energy per pseudonoise (PN) chips, power spectral density, and other signals. Wireless device 1102 also includes a digital signal processor (DSP) 1120 for use in processing signals.

The various components of wireless device 1102 are coupled together by a bus system 1122 which may include a power bus, a control signal bus, and a status signal bus in addition to a data bus. For the sake of clarity, the various busses are illustrated in FIG. 25D as the bus system 1122.

The methods and apparatus disclosed herein may be applied generally in any transceiving and/or audio sensing application, especially mobile or otherwise portable instances of such applications. For example, the range of configurations disclosed herein includes communications devices that reside in a wireless telephony communication system configured to employ a code-division multiple-access (CDMA) over-the-air interface. Nevertheless, it would be understood by those skilled in the art that a method and apparatus having features as described herein may reside in any of the various communication systems employing a wide range of technologies known to those of skill in the art, such as systems employing Voice over IP (VoIP) over wired and/or wireless (e.g., CDMA, TDMA, FDMA, and/or TD-SCDMA) transmission channels.

It is expressly contemplated and hereby disclosed that communications devices disclosed herein may be adapted for use in networks that are packet-switched (for example, wired and/or wireless networks arranged to carry audio transmissions according to protocols such as VoIP) and/or circuit-switched. It is also expressly contemplated and hereby disclosed that communications devices disclosed herein may be adapted for use in narrowband coding systems (e.g., systems that encode an audio frequency range of about four or five kilohertz) and/or for use in wideband coding systems (e.g., systems that encode audio frequencies greater than five kilohertz), including whole-band wideband coding systems and split-band wideband coding systems.

The presentation of the described configurations is provided to enable any person skilled in the art to make or use the methods and other structures disclosed herein. The flowcharts, block diagrams, and other structures shown and described herein are examples only, and other variants of these structures are also within the scope of the disclosure. Various modifications to these configurations are possible, and the generic principles presented herein may be applied to other configurations as well. Thus, the present disclosure is not intended to be limited to the configurations shown above but rather is to be accorded the widest scope consistent with the principles and novel features disclosed in any fashion herein, including in the attached claims as filed, which form a part of the original disclosure.

Those of skill in the art will understand that information and signals may be represented using any of a variety of different technologies and techniques. For example, data, instructions, commands, information, signals, bits, and symbols that may be referenced throughout the above description may be represented by voltages, currents, electromagnetic waves, magnetic fields or particles, optical fields or particles, or any combination thereof.

Important design requirements for implementation of a configuration as disclosed herein may include minimizing processing delay and/or computational complexity (typically measured in millions of instructions per second or MIPS), especially for computation-intensive applications, such as playback of compressed audio or audiovisual information (e.g., a file or stream encoded according to a compression format, such as one of the examples identified herein) or applications for wideband communications (e.g., voice communications at sampling rates higher than eight kilohertz, such as 12, 16, 32, 44.1, 48, or 192 kHz).

An apparatus as disclosed herein (e.g., apparatus A100, A300, A500, MF100, MF140, MF150, MF300, MF500) may be implemented in any combination of hardware with software, and/or with firmware, that is deemed suitable for the intended application. For example, the elements of such an apparatus may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (for example, within a chipset including two or more chips).

One or more elements of the various implementations of the apparatus disclosed herein (e.g., apparatus A100, A300, A500, MF100, MF140, MF150, MF300, MF500) may be implemented in whole or in part as one or more sets of instructions arranged to execute on one or more fixed or programmable arrays of logic elements, such as microprocessors, embedded processors, IP cores, digital signal processors, FPGAs (field-programmable gate arrays), ASSPs (application-specific standard products), and ASICs (application-specific integrated circuits). Any of the various elements of an implementation of an apparatus as disclosed herein may also be embodied as one or more computers (e.g., machines including one or more arrays programmed to execute one or more sets or sequences of instructions, also called "processors"), and any two or more, or even all, of these elements may be implemented within the same such computer or computers.

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs, FPGAs, ASSPs, and ASICs. A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to a procedure of an implementation of method M100, such as a task relating to another operation of a device or system in which the processor is embedded (e.g., an audio sensing device). It is also possible for part of a method as disclosed herein to be performed by a processor of the audio sensing device and for another part of the method to be performed under the control of one or more other processors.

Those of skill will appreciate that the various illustrative modules, logical blocks, circuits, and tests and other operations described in connection with the configurations disclosed herein may be implemented as electronic hardware, computer software, or combinations of both. Such modules, logical blocks, circuits, and operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

It is noted that the various methods disclosed herein (e.g., implementations of any of methods M100, M200, M300, M400, M500, M600, and M700) may be performed by an array of logic elements such as a processor, and that the various elements of an apparatus as described herein may be implemented as modules designed to execute on such an array. As used herein, the term "module" or "sub-module" can refer to any method, apparatus, device, unit or computer-readable data storage medium that includes computer instructions (e.g., logical expressions) in software, hardware or firmware form. It is to be understood that multiple modules or systems can be combined into one module or system and one module or system can be separated into multiple modules or systems to perform the same functions. When implemented in software or other computer-executable instructions, the elements of a process are essentially the code segments to perform the related tasks, such as with routines, programs, objects, components, data structures, and the like. The term "software" should be understood to include source code, assembly language code, machine code, binary code, firmware, macrocode, microcode, any one or more sets or sequences of instructions executable by an array of logic elements, and any combination of such examples. The program or code segments can be stored in a processor readable medium or transmitted by a computer data signal embodied in a carrier wave over a transmission medium or communication link.

The implementations of methods, schemes, and techniques disclosed herein may also be tangibly embodied (for example, in tangible, computer-readable features of one or more computer-readable storage media as listed herein) as one or more sets of instructions executable by a machine including an array of logic elements (e.g., a processor, microprocessor, microcontroller, or other finite state machine). The term "computer-readable medium" may include any medium that can store or transfer information, including volatile, nonvolatile, removable, and non-removable storage media. Examples of a computer-readable medium include an electronic circuit, a semiconductor memory device, a ROM, a flash memory, an erasable ROM (EROM), a floppy diskette or other magnetic storage, a CD-ROM/DVD or other optical storage, a hard disk or any other medium which can be used to store the desired information, a fiber optic medium, a radio frequency (RF) link, or any other medium which can be used to carry the desired information and can be accessed. The computer data signal may include any signal that can propagate over a transmission medium such as electronic network channels, optical fibers, air, electromagnetic, RF links, etc. The code segments may be downloaded via computer networks such as the Internet or an intranet. In any case, the scope of the present disclosure should not be construed as limited by such embodiments.

Each of the tasks of the methods described herein may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive and/or transmit encoded frames.

It is expressly disclosed that the various methods disclosed herein may be performed by a portable communications device such as a handset, headset, or portable digital assistant (PDA), and that the various apparatus described herein may be included within such a device. A typical real-time (e.g., online) application is a telephone conversation conducted using such a mobile device.

In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer-readable storage media and communication (e.g., transmission) media. By way of example, and not limitation, computer-readable storage media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage; and/or magnetic disk storage or other magnetic storage devices. Such storage media may store information in the form of instructions or data structures that can be accessed by a computer. Communication media can comprise any medium that can be used to carry desired program code in the form of instructions or data structures and that can be accessed by a computer, including any medium that facilitates transfer of a computer program from one place to another. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

An acoustic signal processing apparatus as described herein may be incorporated into an electronic device that accepts speech input in order to control certain operations, or that may otherwise benefit from separation of desired noises from background noises, such as communications devices. Many applications may benefit from enhancing or separating clear desired sound from background sounds originating from multiple directions. Such applications may include human-machine interfaces in electronic or computing devices which incorporate capabilities such as voice recognition and detection, speech enhancement and separation, voice-activated control, and the like. It may be desirable to implement such an acoustic signal processing apparatus to be suitable in devices that only provide limited processing capabilities.

The elements of the various implementations of the modules, elements, and devices described herein may be fabricated as electronic and/or optical devices residing, for example, on the same chip or among two or more chips in a chipset. One example of such a device is a fixed or programmable array of logic elements, such as transistors or gates. One or more elements of the various implementations of the apparatus described herein may also be implemented in whole or in part as one or more sets of instructions arranged to execute on one or more fixed or programmable arrays of logic elements such as microprocessors, embedded processors, IP cores, digital signal processors, FPGAs, ASSPs, and ASICs.

It is possible for one or more elements of an implementation of an apparatus as described herein to be used to perform tasks or execute other sets of instructions that are not directly related to an operation of the apparatus, such as a task relating to another operation of a device or system in which the apparatus is embedded. It is also possible for one or more elements of an implementation of such an apparatus to have structure in common (e.g., a processor used to execute portions of code corresponding to different elements at different times, a set of instructions executed to perform tasks corresponding to different elements at different times, or an arrangement of electronic and/or optical devices performing operations for different elements at different times).

What is claimed is:

1. A method of processing an audio signal, said method comprising:
calculating at least one value of a decision metric for a second frame of the audio signal that is subsequent in the audio signal to a first frame of the audio signal; and
based on said at least one calculated value of the decision metric, selecting one among a plurality of reallocation candidates,
wherein said calculated at least one value is based on a measure of compressibility of the second frame, and
wherein said selected reallocation candidate indicates a reallocation of an initial bit allocation for the second frame into a first portion and a second portion.

2. The method according to claim 1, wherein said method includes determining that said first frame is a critical frame of the audio signal.

3. The method according to claim 2, wherein said determining that said first frame is a critical frame is based on information from an encoded version of a frame of the audio signal that is subsequent in the audio signal to the first frame.

4. The method according to claim 3, wherein said encoded version is an encoded version of the second frame.

5. The method according to claim 2, wherein said determining includes comparing a criticality measure to a criticality threshold.

6. The method according to claim 5, wherein said determining includes calculating the criticality threshold based on information relating to a state of a transmission channel.

7. The method according to claim 6, wherein said calculating the criticality threshold includes:
comparing a calculated value that is based on the information relating to the state of the transmission channel to a boundary value; and
in response to a result of said comparing to the boundary value, selecting the boundary value as the criticality threshold.

8. The method according to claim 1, wherein said measure of compressibility indicates a correlation among subframes of the second frame.

9. The method according to claim 1, wherein said selecting one among the plurality of reallocation candidates includes comparing a calculated value of the decision metric to each of an ordered plurality of decision thresholds, and
wherein each of the ordered plurality of decision thresholds corresponds to a different one among the plurality of reallocation candidates.

10. The method according to claim 1, wherein said method comprises calculating a plurality of values of the decision metric, each corresponding to a different frame of the audio signal that is subsequent in the audio signal to said first frame, and
wherein each of said plurality of values of the decision metric is based on a measure of compressibility of the corresponding frame, and
wherein said method comprises, based on at least some of said plurality of values of the decision metric, selecting said second frame from among said different frames.

11. The method according to claim 1, wherein said calculated at least one value of the decision metric includes a set of calculated values of the decision metric, and wherein each of the set of calculated values corresponds to a different one of the plurality of reallocation candidates.

12. The method according to claim 11, wherein each of the set of calculated values is based on a measure of perceptual quality associated with the corresponding one of the plurality of reallocation candidates.

13. The method according to claim 11, wherein said measure of compressibility is based on information from an encoded version of the second frame.

14. The method according to claim 11, wherein said at least one calculated value is based on a relation between measures of perceptual quality of the second frame for different encoding rates.

15. The method according to claim 11, wherein said at least one calculated value is based on a relation between (A) a measure of compressibility of the second frame for the initial bit allocation and (B) a measure of compressibility of the second frame for the corresponding one of the plurality of reallocation candidates.

16. The method according to claim 1, wherein said calculated at least one value of the decision metric includes a plurality of sets of calculated values of the decision metric, each of the plurality of sets corresponding to a different frame of the audio signal that is subsequent in the audio signal to said first frame, and wherein, within each set, each value corresponds to a different one of the plurality of reallocation candidates.

17. The method according to claim 16, wherein, within each set, each value is based on a measure of perceptual quality associated with the corresponding one of the plurality of reallocation candidates.

18. The method according to claim 16, wherein, within each set, each value is based on information from an encoded version of the corresponding frame.

19. The method according to claim 16, wherein said method comprises, based on calculated values of at least some of said plurality of sets, selecting said second frame from among said different frames.

20. The method according to claim 1, wherein said method comprises, in response to said selecting one among the plurality of reallocation candidates, producing a packet that includes a redundant copy of said first frame and a copy of said second frame,
wherein the copy of said second frame is encoded into said first portion, and
wherein said redundant copy is encoded into said second portion.

21. An apparatus for processing an audio signal, said apparatus comprising:
means for calculating at least one value of a decision metric for a second frame of the audio signal that is subsequent in the audio signal to a first frame of the audio signal; and
means for selecting one among a plurality of reallocation candidates, based on said at least one calculated value of the decision metric,
wherein said calculated at least one value is based on a measure of compressibility of the second frame, and
wherein said selected reallocation candidate indicates a reallocation of an initial bit allocation for the second frame into a first portion and a second portion.

22. The apparatus according to claim 21, wherein said apparatus includes means for determining that said first frame is a critical frame of the audio signal.

23. The apparatus according to claim 22, wherein said determining that said first frame is a critical frame is based on information from an encoded version of a frame of the audio signal that is subsequent in the audio signal to the first frame.

24. The apparatus according to claim 21, wherein said measure of compressibility indicates a correlation among subframes of the second frame.

25. The apparatus according to claim 21, wherein said means for calculating at least one value of the decision metric is configured to calculate a plurality of values of the decision metric, each corresponding to a different frame of the audio signal that is subsequent in the audio signal to said first frame, and
wherein each of said plurality of values of the decision metric is based on a measure of compressibility of the corresponding frame, and
wherein said apparatus comprises means for selecting said second frame from among said different frames, based on at least some of said plurality of values of the decision metric.

26. The apparatus according to claim 21, wherein said calculated at least one value of the decision metric includes a set of calculated values of the decision metric, and wherein each of the set of calculated values corresponds to a different one of the plurality of reallocation candidates, and
wherein each of the set of calculated values is based on a measure of perceptual quality associated with the corresponding one of the plurality of reallocation candidates.

27. The apparatus according to claim 21, wherein said calculated at least one value of the decision metric includes a set of calculated values of the decision metric, and wherein each of the set of calculated values corresponds to a different one of the plurality of reallocation candidates, and wherein said at least one calculated value is based on a relation between measures of perceptual quality of the second frame for different encoding rates.

28. The apparatus according to claim 21, wherein said apparatus comprises means for producing, in response to said selecting one among the plurality of reallocation candidates, a packet that includes a redundant copy of said first frame and a copy of said second frame, wherein the copy of said second frame is encoded into said first portion, and wherein said redundant copy is encoded into said second portion.

29. An apparatus for processing an audio signal, said apparatus comprising:

a calculator configured to calculate at least one value of a decision metric for a second frame of the audio signal that is subsequent in the audio signal to a first frame of the audio signal; and a selector configured to select one among a plurality of reallocation candidates, based on said at least one calculated value of the decision metric, wherein said calculated at least one value is based on a measure of compressibility of the second frame, and wherein said selected reallocation candidate indicates a reallocation of an initial bit allocation for the second frame into a first portion and a second portion.

30. The apparatus according to claim 29, wherein said apparatus includes a critical frame indicator configured to determine that said first frame is a critical frame of the audio signal.

31. The apparatus according to claim 30, wherein said determining that said first frame is a critical frame is based on information from an encoded version of a frame of the audio signal that is subsequent in the audio signal to the first frame.

32. The apparatus according to claim 29, wherein said measure of compressibility indicates a correlation among subframes of the second frame.

33. The apparatus according to claim 29, wherein said calculator is configured to calculate a plurality of values of the decision metric, each corresponding to a different frame of the audio signal that is subsequent in the audio signal to said first frame, and wherein each of said plurality of values of the decision metric is based on a measure of compressibility of the corresponding frame, and wherein said selector is configured to select said second frame from among said different frames, based on at least some of said plurality of values of the decision metric.

34. The apparatus according to claim 29, wherein said calculated at least one value of the decision metric includes a set of calculated values of the decision metric, and wherein each of the set of calculated values corresponds to a different one of the plurality of reallocation candidates, and wherein each of the set of calculated values is based on a measure of perceptual quality associated with the corresponding one of the plurality of reallocation candidates.

35. The apparatus according to claim 29, wherein said calculated at least one value of the decision metric includes a set of calculated values of the decision metric, and wherein each of the set of calculated values corresponds to a different one of the plurality of reallocation candidates, and wherein said at least one calculated value is based on a relation between measures of perceptual quality of the second frame for different encoding rates.

36. The apparatus according to claim 29, wherein said apparatus comprises a packet assembler configured to produce, in response to said selecting one among the plurality of reallocation candidates, a packet that includes a redundant copy of said first frame and a copy of said second frame, wherein the copy of said second frame is encoded into said first portion, and wherein said redundant copy is encoded into said second portion.

37. A non-transitory computer-readable data storage medium having tangible features that cause a machine reading the features to:

calculate at least one value of a decision metric for a second frame of the audio signal that is subsequent in the audio signal to a first frame of the audio signal; and select one among a plurality of reallocation candidates, based on said at least one calculated value of the decision metric, wherein said calculated at least one value is based on a measure of compressibility of the second frame, and wherein said selected reallocation candidate indicates a reallocation of an initial bit allocation for the second frame into a first portion and a second portion.

38. The medium according to claim 37, wherein said medium includes tangible features that cause a machine reading the features to determine that said first frame is a critical frame of the audio signal, and wherein said determining that said first frame is a critical frame is based on information from an encoded version of a frame of the audio signal that is subsequent in the audio signal to the first frame.

39. The medium according to claim 37, wherein said measure of compressibility indicates a correlation among subframes of the second frame.

40. The medium according to claim 37, wherein said medium comprises tangible features that cause a machine reading the features to produce a packet, in response to said selecting one among the plurality of reallocation candidates, that includes a redundant copy of said first frame and a copy of said second frame, wherein the copy of said second frame is encoded into said first portion, and wherein said redundant copy is encoded into said second portion.

* * * * *